United States Patent
Baker et al.

(10) Patent No.: US 8,834,134 B2
(45) Date of Patent: Sep. 16, 2014

(54) FLOW SENSING DUAL PUMP SWITCHING SYSTEM AND METHOD

(75) Inventors: Carthel C. Baker, Oregon, IL (US); Dmitriy Baryshnikov, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 636 days.

(21) Appl. No.: 12/972,905

(22) Filed: Dec. 20, 2010

(65) Prior Publication Data

US 2012/0156061 A1 Jun. 21, 2012

(51) Int. Cl.
*F04B 49/00* (2006.01)
*G05D 7/00* (2006.01)
*F02C 7/236* (2006.01)
*F04B 23/04* (2006.01)

(52) U.S. Cl.
CPC ............... *F02C 7/236* (2013.01); *F04B 23/04* (2013.01)
USPC ............... 417/288; 417/2; 417/304; 123/446

(58) Field of Classification Search
USPC ............. 417/2, 3, 4, 286, 288, 302, 304, 307, 417/308, 310, 428, 440; 123/446
See application file for complete search history.

(56) References Cited

U.S. PATENT DOCUMENTS

| | | | |
|---|---|---|---|
| 2,835,323 A | 5/1958 | Booth | |
| 3,011,308 A | 12/1961 | Wotring | |
| 3,953,153 A | 4/1976 | Huber et al. | |
| 4,102,606 A | 7/1978 | Huber et al. | |
| 4,245,964 A | 1/1981 | Rannenberg | |
| 4,591,317 A | 5/1986 | Markunas | |
| 5,118,258 A | 6/1992 | Martin | |
| 5,918,573 A | 7/1999 | Killion | |
| 6,095,118 A | 8/2000 | Klinger et al. | |
| 6,487,847 B1 | 12/2002 | Snow et al. | |
| 8,166,765 B2 * | 5/2012 | Baker et al. | 60/772 |
| 8,172,551 B2 * | 5/2012 | Baker | 417/213 |
| 8,302,406 B2 * | 11/2012 | Baker | 60/772 |
| 2010/0089025 A1 | 4/2010 | Baker | |
| 2012/0045348 A1 * | 2/2012 | Garry | 417/302 |

FOREIGN PATENT DOCUMENTS

WO   WO 2007/044020 A2   4/2007

\* cited by examiner

*Primary Examiner* — Peter J Bertheaud
(74) *Attorney, Agent, or Firm* — Reinhart Boerner Van Deuren P.C.

(57) ABSTRACT

A flow sensing dual pump switching system and method are provided that control the supply of fuel from a dual pump fuel system to a fuel metering unit. The system senses bypass pressure from the fuel metering unit to control the differential pressurization of the second pump. As the bypass is reduced, the pressure of the second pump is increased so that it may be added to that of the first pump to supply the increased fuel consumption needs of an engine. As the fuel consumption needs decrease, the flow from the second pump added to the first pump is reduced and the differential pressure of the second pump is similarly reduced. If the bypass pressure remains high, the switching system disconnects the output of the second pump from that of the first in favor of bypassing the flow to its input to reduce its differential pressure and conserve energy.

30 Claims, 19 Drawing Sheets

FLOW SENSING DUAL PUMP SWITCHING SYSTEM AND METHOD

FIELD OF THE INVENTION

The present invention relates generally to aircraft engine fuel control systems, and more particularly to aircraft engine fuel control systems that utilize a dual pump fuel control system for supplying fuel to the aircraft engine over widely varying fuel supply needs.

BACKGROUND OF THE INVENTION

The primary function of a fuel supply system is to provide a sufficient flow of fuel to an engine to meet its operating demands. In continuous combustion engines, such as those typically used in a turbine aircraft engine, the fuel supply system typically employs high pressure positive displacement fuel pumps. Such high pressure positive displacement fuel pumps are typically driven via a gear box coupled to the main turbine engine. As such, the pump flow rate in such a fuel supply system is directly proportional to the engine speed, i.e. the greater the speed of the turbine engine, the greater the fuel flow rate from the high pressure positive displacement fuel pump.

While such a configuration is successful at providing a fuel flow rate to the turbine engine that allows the engine to meet its operational demands, these operational demands do not always require such a high flow rate of fuel. Indeed, there are many engine operating conditions at which the engine flow demand for fuel is significantly less than the high pressure flow supplied by the positive displacement pump. Because the excess flow of fuel not required by the engine must flow somewhere, it is typical that the excess high pressure fuel is bypassed back to the low pressure inlet of the high pressure positive displacement fuel pump. Unfortunately, raising the pressure of the excess fuel flow and returning that excess flow back to the low pressure inlet of the pump effectively wastes the energy that had been added to the fuel as it was supplied to the turbine engine. This wasted energy is realized as a heat input into the fuel, and often results in undesirably high fuel temperatures in some operating conditions.

In an attempt to overcome this thermal issue, many fuel control system designers have implemented a dual pump system. In such a system, two fuel pumps are utilized to supply the engine with a flow of fuel that is more closely related to the actual fuel demand by the engine. This is accomplished through a switching system whereby the fuel flow from the second pump may be added to the fuel flow from the first pump only when the engine demands exceed the capability of the first pump for providing sufficient fuel flow. In this way, during low fuel demand operating modes, only the flow from one of the fuel pumps is supplied to the engine, and therefore the potential for excess flow that must be returned to the pump inlet is reduced. While during such low fuel demand operating modes the second pump continues to operate, such dual pump systems typically return the output of the second pump to its input directly such that the second pump operates with a minimum pressure differential across it. However, as the fuel demand from the engine increases beyond the capability of the first pump, such dual pump systems typically add the flow from the second pump to that of the first pump so as to ensure an adequate supply of fuel to the engine.

While such typical dual pump fuel supply systems have addressed the thermal increase issue common with the use of a single high pressure positive displacement fuel pump, the addition of the fuel flow from the second fuel pump to that of the first often results in engine burn flow disturbances that are associated with the switch between the pumping modes. In modern high efficiency turbine engines, such burn flow disturbances are unacceptable. Various control mechanisms including bypass valve position sensing, solenoid control, engine speed sensing, etc. have been tried in an effort to minimize the fuel flow disturbances resulting when the fuel supply system is transitioned between the single and dual pump modes of operation. While some of these systems have met with success, each require additional control signals from the engine control unit, fuel metering unit, or other components within the overall turbine engine control system. This increases the complexity, and therefore reduces the reliability, of the overall system.

There is need in the art, therefore, for dual pump fuel supply system that reduces or overcomes the problems existing in the art. Embodiments of the present invention provide such a dual pump fuel supply system and switching methods. These and other advantages of the invention, as well as additional inventive features, will be apparent from the description of the invention provided herein.

BRIEF SUMMARY OF THE INVENTION

In view of the above, embodiments of the present invention provide a new and improved dual pump fuel supply system that reduces or overcomes one or more of the problems existing in the art. More particularly, embodiments of the present invention provide a new and improved dual pump fuel supply system for an aircraft turbine engine that includes a dual pump switching system to reduce the engine burn flow disturbances associated with transitions between pumping modes. Still more particularly, embodiments of the present invention provide a new and improved dual pump fuel supply switching system that utilizes the fuel bypass return from the fuel metering unit to regulate the amount of flow supplied from the dual pump system to the fuel metering unit such that adequate fuel flow is supplied to the engine to meet its operating demands while reducing the engine burn flow disturbances known to exist in prior dual pump fuel supply systems.

In one embodiment, a flow sensing valve senses the bypass return flow from the fuel metering unit and regulates the amount of flow supplied from the dual pump system to the fuel metering unit based on the flow sensing port's position. This flow sensing valve, i.e. a valve containing the flow sensing port, is designed such that the force balance across the valve acts to maintain a nearly constant differential pressure from the valve's flow sensing port inlet to the port's discharge. Bypass return flow from the fuel metering unit is returned to the fuel pumps through this sensing port. The fuel sensing valve's position, therefore, is a function of the amount of bypass flow returned to the pump from the fuel metering unit. As such, a repeatable valve position versus fuel metering unit bypass return flow results.

In one embodiment, based on the position of the flow sensing valve, the flow sharing or pump switching valve supplies a portion of the second pump flow to the high pressure supply to the fuel metering unit, in addition to the flow from the first pump, in order to meet the engine flow demand during high fuel demand operating modes. Alternatively, the flow sharing or pump switching valve bypasses the total output flow of the second pump at a low pressure back to the inlet of that pump to minimize the thermal rise otherwise resulting from a high bypass flow situation.

Embodiments of the dual pump switching system of the present invention allow the discharge flow from the two pumps to be separated when operating in a single pump mode, and then combined when operating in a dual pump mode. In a single pump mode, the first pump supplies all high pressure burn flow to be used by the combustor. Other required engine flows can be supplied by either of the two pumps depending on how the fuel system is configured without effect on the operation of the main fuel supply to the combustor. With an embodiment of the present invention operating in a single pump mode, the discharge pressure of pump one is set by the downstream restrictions, including fuel nozzle restrictions and the combustor pressure. The second pump discharge pressure can be controlled independently of that of the first pump discharge pressure. In this embodiment, the system thermal benefit and reduction in power input comes from minimizing the pressure differential across the second pump when operating in a single pump mode. When the engine flow demand approaches the capacity of the first pump, the second pump pressure is raised above that of the first pump pressure, and a portion of the fuel flow from the second pump is supplied to supplement that from the first pump.

In an embodiment of the present invention, the bypass flow of fuel from the fuel metering unit is used to control the pressurization of the secondary pump. In a first mode a reduction in the bypass flow from the fuel metering unit will increase the pressure differential of the second pump. This will allow its output to be available to supplement that of the first pump as the engine demand for fuel increases beyond that supplied by the first pump. In a second mode an increase in the bypass return from the fuel metering unit will decrease the pressure differential across the secondary pump to minimize energy consumption during periods of low fuel demand from the engine which can adequately be supplied by the first fuel pump. The pressurization of the second pump in one embodiment is used to control the amount of the second pump flow that is added to that of the first pump, while other embodiments utilize the fuel bypass flow from the fuel metering unit to control same.

In one embodiment of the present invention, the flow sensing dual pump switching system of the present invention utilizes a sensing valve, a pressure regulating valve for the second pump, and a flow sharing valve that controls the amount of flow from the second pump that is added to the flow of the first pump to form the high pressure fuel supply to the fuel metering unit. In another embodiment of the present invention, an adder valve is utilized to provide the proportional addition or reduction of flow from the second pump to that of the first. And yet in a further embodiment, a separate sensing valve is not required, and instead its functionality is incorporated with the flow sharing valve that then both controls the pressurization of the second pump via a pressure regulating valve as well the addition or reduction of the amount of flow from the second pump to that of the first pump. In yet a further embodiment utilizing an adder valve, the functionality of the sensing valve as well as that of the pressure regulating valve are combined into a single valve. In yet a further embodiment, the functionality of each of these individual valves in the various embodiments are combined into a single valve that senses the bypass return flow from the fuel metering unit, pressurizes the second pump, and adds or reduces the fuel flow therefrom to that of the first pump to form the high pressure supply to the fuel metering unit.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
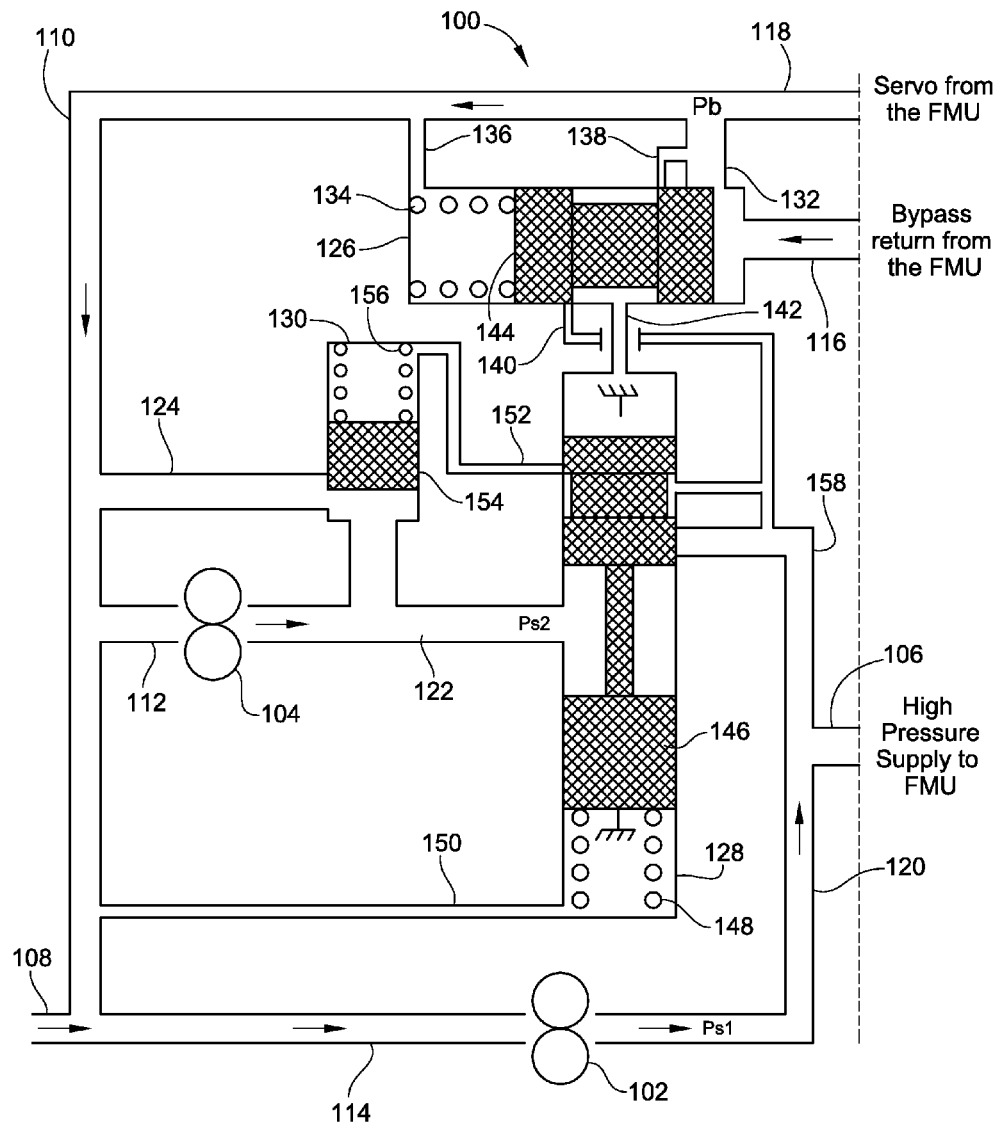
FIGS. 1-5 are schematic illustrations of an embodiment of the present invention utilizing a proportional plus integral bypass return sensing pump switch with a flow sharing valve in different operating modes.
Figure 2:
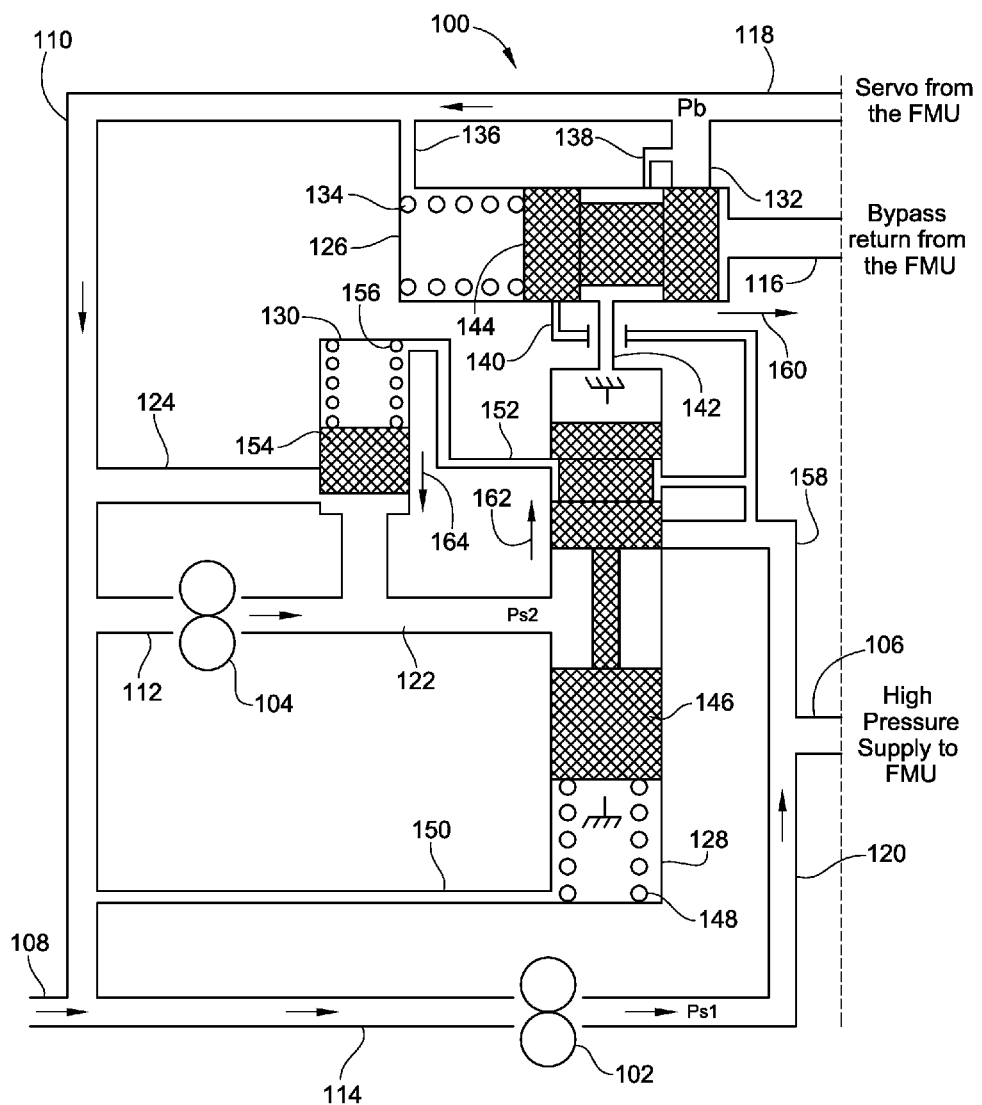

Turning now to the drawings, there is illustrated in FIG. 1 a schematic illustration of one embodiment of a flow sensing dual pump switching system constructed in accordance with the teachings of the present invention. As illustrated, this embodiment is particularly well suited for application to an aircraft turbine engine. As such, the following will provide a description of the operation of this and other embodiments of the present invention in such an operating environment. However, it should be noted that other applications for a flow sensing dual pump switching system and a dual pump fluid supply system utilizing same are foreseen, and therefore the operating environment discussed below should be taken by way of example and not by way of limitation.

For the embodiments of flow sensing dual pump switching system discussed hereinbelow, each embodiment is shown in conjunction with a dual pump fluid (fuel) supply system that includes a first pump 102 and a second pump 104. Typically, each of the first pump 102 and second pump 104 are fixed displacement pumps, although this is not a requirement. Similarly, the first and second pumps 102, 104 may have the same displacement, or may have different displacements depending on the operating requirements of the system into which they are installed. The dual pump system also typically includes a high pressure supply 106 to a fuel metering unit (not shown), a fuel supply 108 to supply fuel to each of the first pump 102 and second pump 104 via their low pressure supplies 112, 114. The dual pump system also includes a bypass return 116 from the fuel metering unit, and may include a servo return 118 from the fuel metering unit as well. These returns 116, 118 couple to a low pressure return 110 that also couples to the low pressure supply 112, 114 for each of the pumps 102, 104. Each of pumps 102, 104 includes a high pressure output 120, 122, respectively, and the second pump 104 includes a second pump bypass 124.

As will become apparent to those skilled in the art from the following description, embodiments in the present invention utilize means for sensing bypass flow from the fuel metering unit, means for controlling the pressurization of the second pump, and means for adding or subtracting the second pump flow to that of the first pump to supply the engine fuel requirements over its operating range. Each of these means may be implemented as individual valving components as will be discussed below in some of the disclosed embodiments, or may be combined in various configurations into integrated valving component also to be discussed below.

Specifically, the embodiment of the flow sensing dual pump switching system 100 illustrated in FIGS. 1-5 includes each of the means as separate components. That is, the means for sensing bypass flow is embodied as sensing valve 126, the means for adding or subtracting the second pump flow to that of the first pump is embodied in a flow sharing valve 128, and the means for controlling the pressurization of the second pump is embodied in a pressure regulating valve 130. The embodiment of the flow sensing dual pump switching system 100' illustrated in FIGS. 6-8 also includes each of the means as separate components. That is, the means for sensing bypass flow is embodied as sensing valve 126', the means for adding or subtracting the second pump flow to that of the first pump is embodied in a flow sharing valve 128', and the means for controlling the pressurization of the second pump is embodied in a pressure regulating valve 130.

Figure 9:
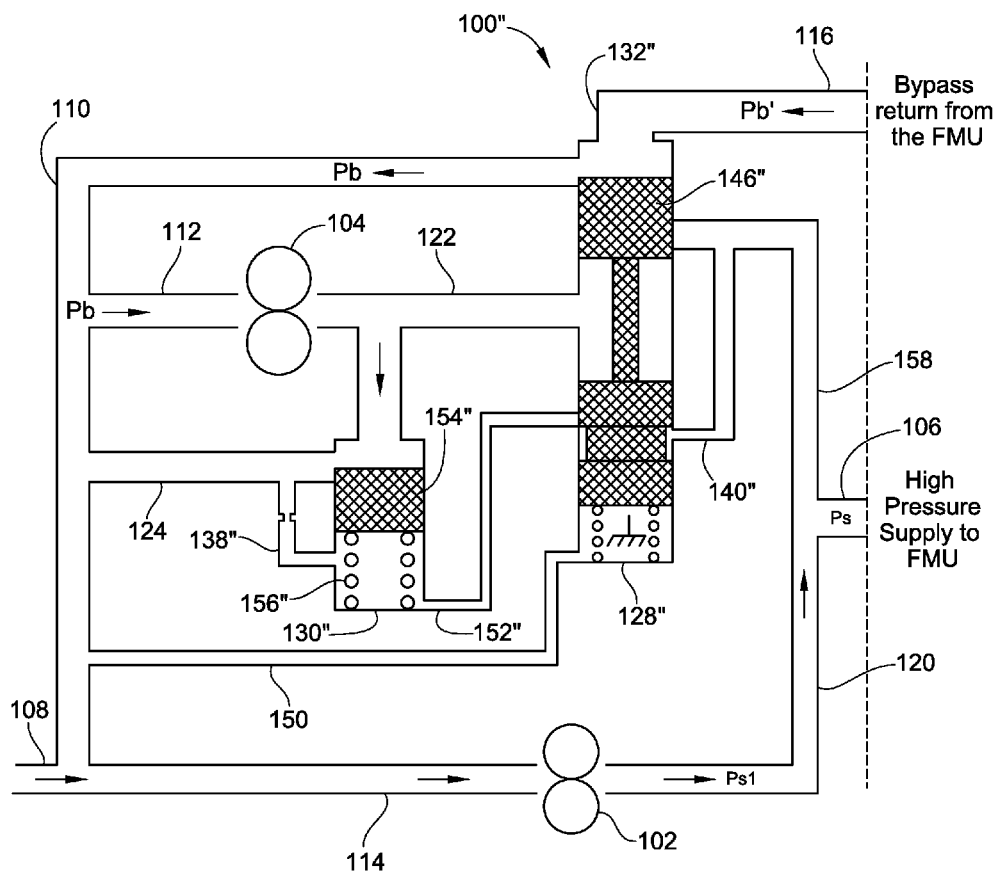
FIGS. 9-11 are schematic illustrations of an embodiment of the present invention utilizing a combined proportional bypass return sensing and flow sharing valve pump switch system in different operating modes.
Figure 10:
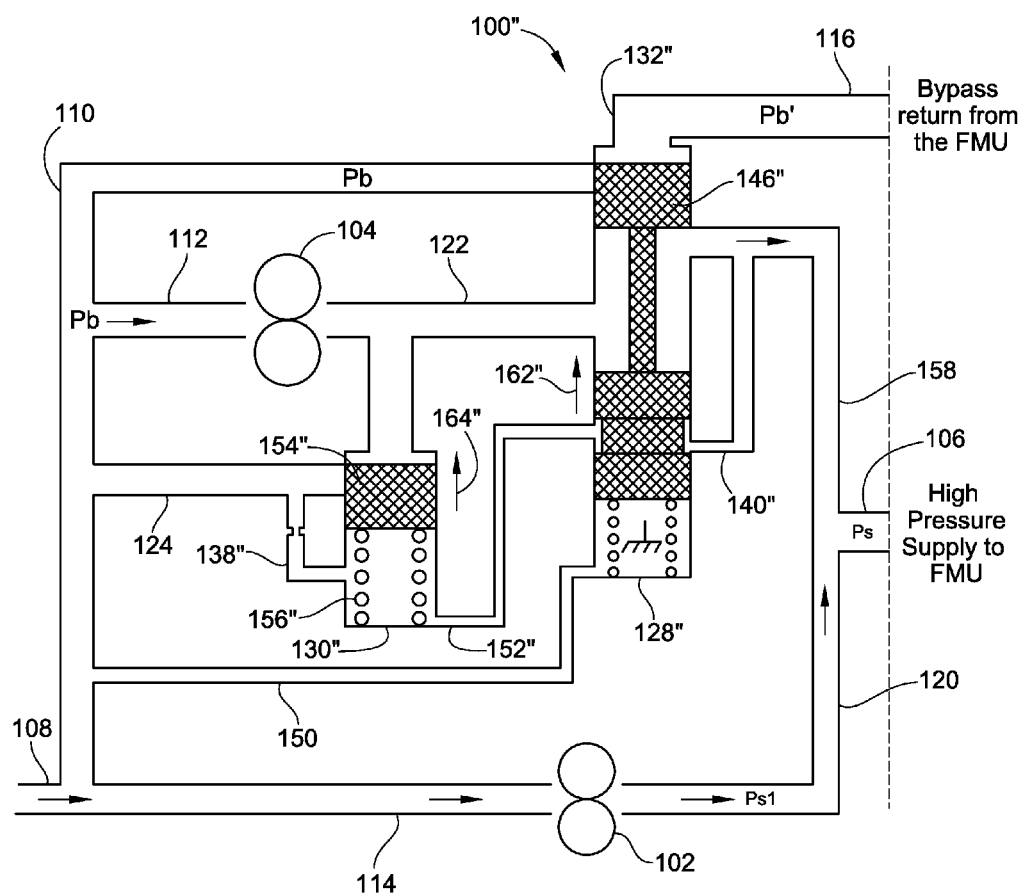
Figure 11:
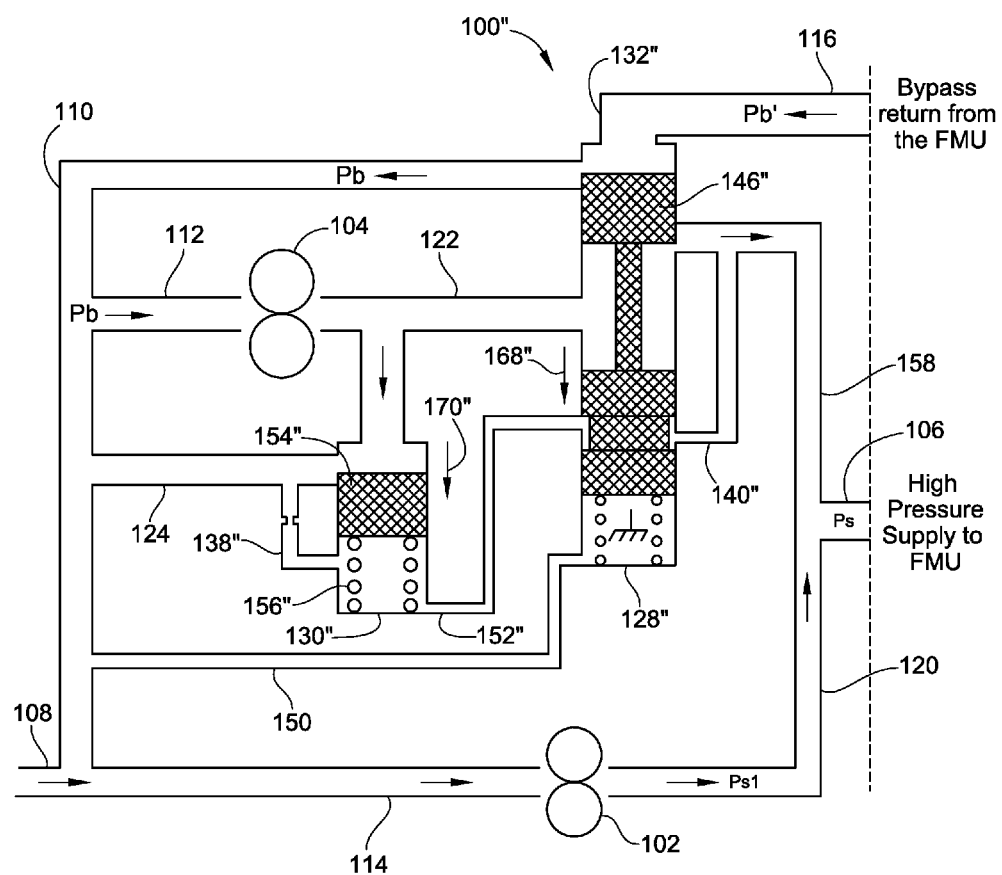

The embodiment of the flow sensing dual pump switching system 100" illustrated in FIGS. 9-11 integrates the functionality of two of the means into a single component and includes one of the means as separate component. That is, the means for sensing bypass flow and the means for adding or subtracting the second pump flow to that of the first pump are embodied in a flow sharing valve 128", and the means for controlling the pressurization of the second pump is embodied in a pressure regulating valve 130". The embodiment of the flow sensing dual pump switching system 100''' illustrated in FIGS. 12-15 integrates the functionality of two of the means into a single component and includes one of the means as separate component. That is, the means for sensing bypass flow and the means for controlling the pressurization of the second pump are embodied in a pressure regulating valve 130''', and the means for adding or subtracting the second pump flow to that of the first pump is embodied in a flow sharing valve 128'''.

The embodiment of the flow sensing dual pump switching system 100"" illustrated in FIGS. 16-19 integrates the functionality of all of the means into a single component. That is, the means for sensing bypass flow, the means for controlling the pressurization of the second pump, and the means for adding or subtracting the second pump flow to that of the first pump is embodied in a pressure regulating valve 130"".

With this structural overview in mind, attention is returned to FIGS. 1-5. While specific operation of this embodiment will be discussed in greater detail hereinbelow, it is instructive to have an overview of the operation of the switching system 100 illustrated in these figures. In general, with the bias spring 134 acting on the downstream reference pressure (Pb) side of the sensing valve's 126 valving member 144 via the sensing valve return port 136 the sensing valve 126 force balance is such that a nearly constant differential pressure is maintained across the sensing valve's 126 sensing port 132. With the port differential pressure maintained at a constant value, the sensing port 132 opening, and therefore the sensing valve's 126 valving member's 144 position is directly a function of the amount of bypass return flow 116 from the fuel metering unit.

The hydraulic bridge of the sensing valve 126 provides a signal via the sensing valve positioning port 142 to move the flow sharing valve's 128 valving member 146 as a function of the sensing valve's 126 valving member's 144 position depending on the amount of bypass flow. That is, when a large amount of bypass return flow is sensed at the sensing port 132 indicating that more then enough flow is being supplied, relatively high pressure is supplied to the flow sharing valve 128. This positions the flow sharing valve's 128 valving member 146 such that no flow from the second pump 104 is supplied to the fuel metering unit. When the bypass return flow is sensed to be less than a desired amount, indicating that insufficient flow is being supplied, the sensing valve's 126 valving member 144 is moved so that relatively low pressure is supplied via the sensing valve's 126 positioning port 142 to the flow sharing valve 128 to position the flow sharing valve's 128 valving member 146 such that flow from the second pump 104 is supplied to the fuel metering unit to supplement the flow from the first pump 102.

As will become apparent from the following description, a feature of the switching system 100 is the control port 152 on the flow sharing valve 128. This control port 152 controls the pressure regulating valve 130 reference pressure and therefore the second pump 104 discharge pressure as a function of the position of the flow sharing valve's valving member 146. The control port 152 is timed such that the second pump discharge pressure is increased to be at least equal to the discharge pressure of the first pump 102 prior to opening the fuel path from the high pressure output 122 to the adder port 158, which will connect the flow path from the first pump 102 to the second pump 104. This pressure regulating feature essentially eliminates backflow from the first pump 102 to the second pump 104 during switching, which is a significant source of flow disturbances during switching operation in prior systems. Similarly, when operating in the single pump mode, the control port 152 allows movement of the valving member 154 such to lower the discharge pressure of the second pump 104 to the minimum required value as will be discussed more fully below. It should also be noted that the flow sharing valve 128 includes bias spring 148 that position the valving member 146 so that both flow from the first pump 102 and the second pump 104 is supplied to the fuel metering unit for start conditions.

The operating condition illustrated in FIG. 1 is that of a single pump mode whereby the output flow from the first pump 102 is sufficient to supply the fuel demands of the engine. In this single pump mode, an acceptable amount of bypass flow via the bypass return 116 from the fuel metering unit exists. As shown during this operating condition, the pressure regulating valve's valving member 154 is positioned to allow the flow from the second pump 104 to flow through the second pump's bypass 124 to reduce energy consumption by reducing the pressure differential thereacross because the output flow from the second pump 104 is not required to supply fuel to the fuel metering unit. The control of this bypass pressure is regulated, at least in part, by the pressure regulating valve's bypass spring 156 during this condition.

As the fuel requirement by the engine increases, the bypass return from the fuel metering unit will reduce because more of the fuel supplied by the first pump 102 will be consumed by the engine leaving less fuel to be bypassed through the bypass return 116. This reduction in the bypass flow will result in the valving member 144 of the sensing valve 126 to move to the right as shown by arrow 160 in FIG. 2. This movement of the valving member 144 will open a connection between the sensing valve's pressure reduction port 138 and the sensing valve's positioning port 142. Since the other side of the flow sharing valve 128 is coupled to the downstream reference pressure (Pb) via the flow sharing valve's return port 150, the valving member 146 will move upward as illustrated in FIG.

2 by arrow 162. This upward movement will result in the opening of a connection between the pressure regulating valve's control port 152 and the adder port 158. The pressure in this adder port 158 will be that of the high pressure output 120 from the first pump 102 initially. This increased pressure on the backside of the pressure regulating valve 130 will result in a downward movement of the valving member 154 as illustrated by arrow 164 of FIG. 2. This downward movement of valving member 154 will increase the output pressure in the high pressure output 122 from the second pump 104.

Figure 3:
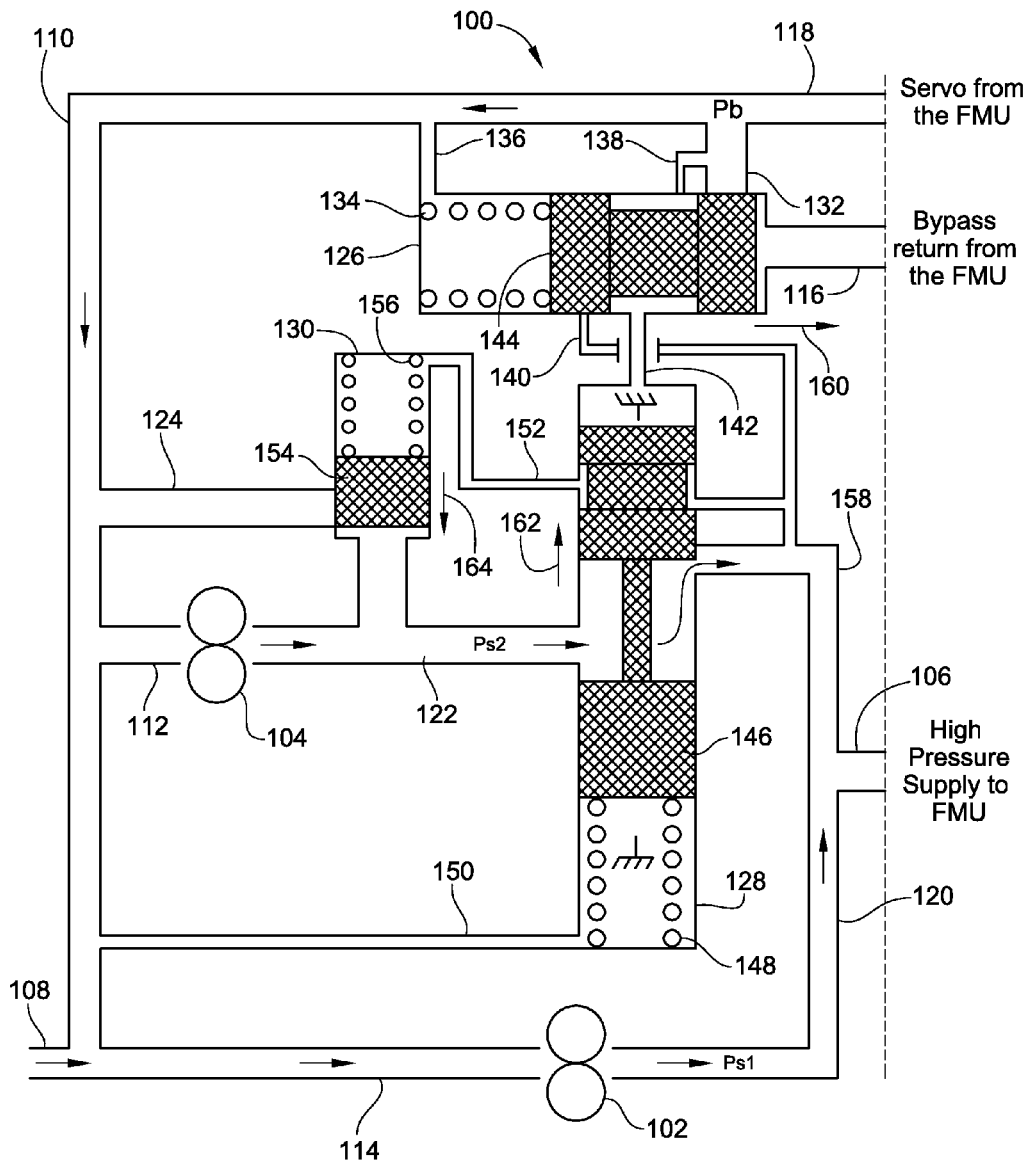

As the valving member 146 of the flow sharing valve 128 continues to move in the upward direction as illustrated by arrow 162, FIG. 3 illustrates that the adder port 158 is then opened to the high pressure output 122 from the second pump 104. This results in adding the flow from the second pump 104 to that of the first pump 102 such that the combined flow from both pumps 102, 104 flows through the high pressure supply 106 to the fuel metering unit. As discussed briefly above, this addition of the high pressure output flow from the second pump 104 occurs after the pressure regulating valve 130 has increased the high output pressure of the second pump 104 to at least that of the first pump 102 so as to reduce the possibility of any flow disturbance to the engine which is common in prior systems.

Figure 4:
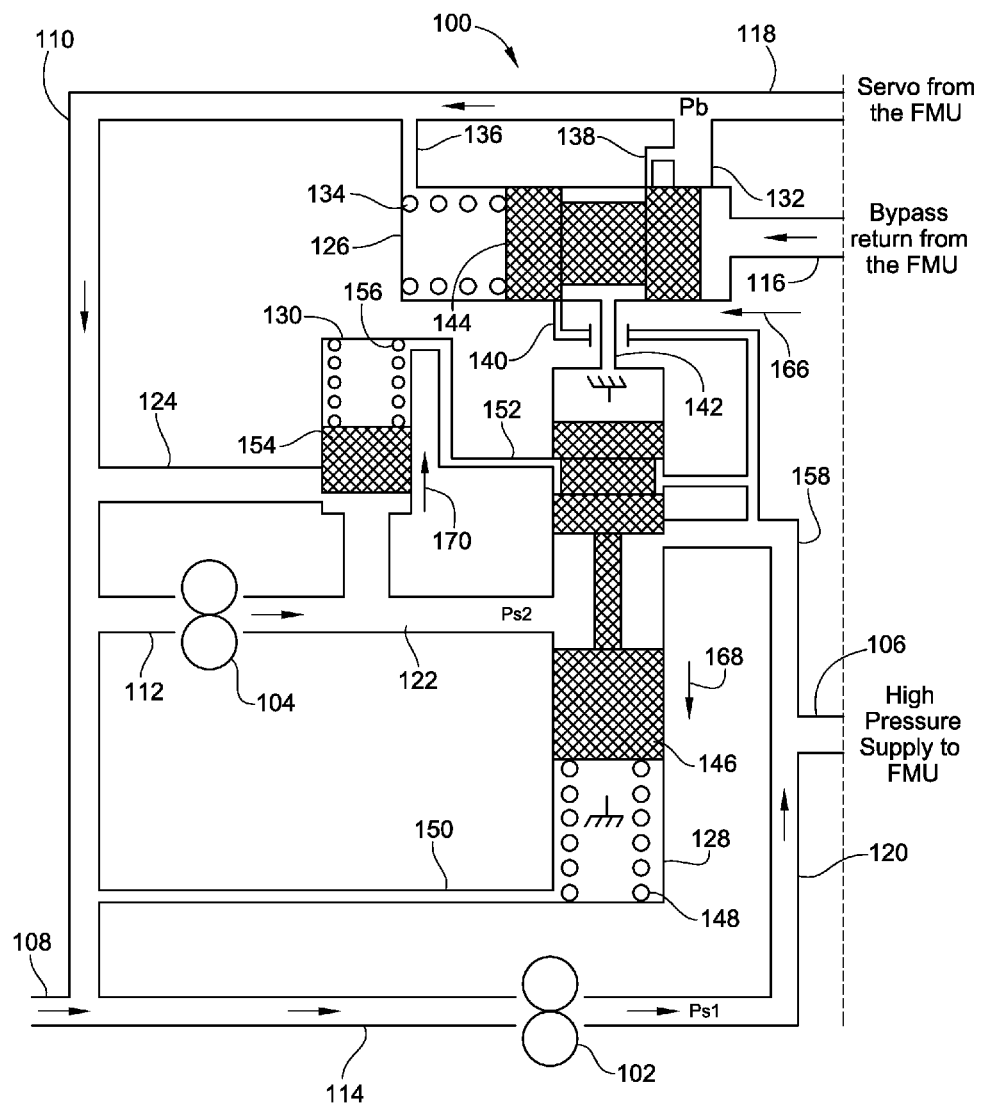

As illustrated in FIG. 4, during the dual pump mode of operation, a reduction in the fuel demand by the engine will result in an increase in the bypass flow in the bypass return 116 from the fuel metering unit. This increased bypass flow will result in the valving member 144 of the sensing valve 126 moving to the left as illustrated by arrow 166 of FIG. 4. This repositioning of the valving member 144 will open the sensing valve's pressure addition port 140 and close the sensing valve's pressure reduction port 138. As a result, the high pressure supplied to the flow sharing valve 126 via the positioning port 142 will result in movement of the valving member 146 downward as illustrated by arrow 168. This downward movement will begin to reduce the amount of flow from the second pump 104 that is coupled to the adder port 158, and will increase the amount of bypass flow through the second pump bypass 124 resulting from the upward movement of valving member 154 of the pressure regulating valve 130 as illustrated by arrow 170 as the control port 152 is closed.

Figure 5:
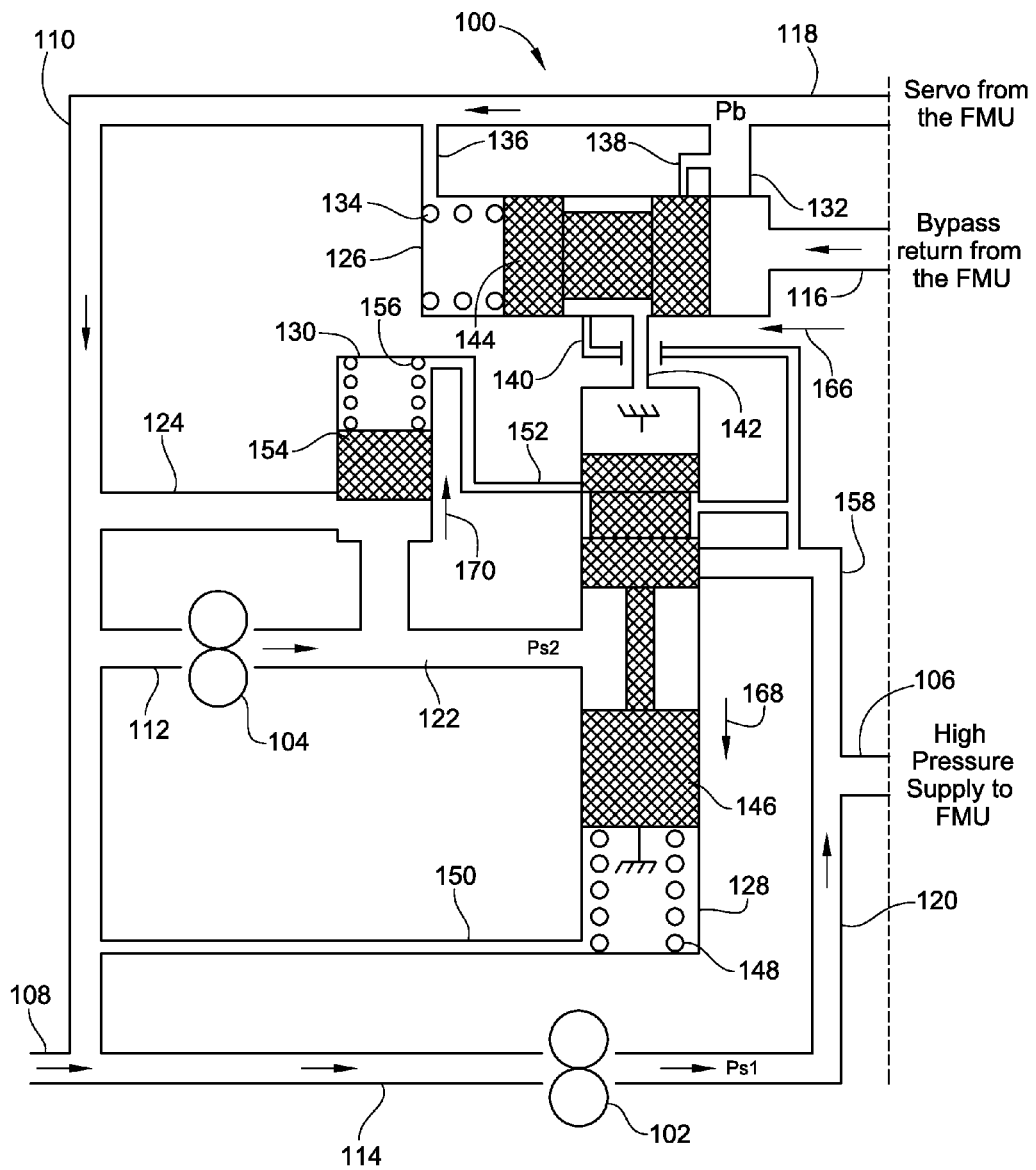

As the fuel demand from the engine continues to be reduced, continued movement of valving member 144 in the direction of arrow 166 will completely close the pressure reduction port 138 and open the pressure addition port 140 as illustrated in FIG. 5. This will result in the valving member 146 being positioned such that no flow from the second pump 144 is coupled to the adder port 158, and instead the maximum flow through bypass 124 is allowed to minimize energy consumption by the system. In this way, the dynamic pressure sensing of the bypass return to control the output pressure flow of the second pump 104 and the proportion of such flow that is added to the output flow of the first pump ensures that an adequate flow of fuel is available to the engine to meet its operating demands without the flow disturbances typical for prior dual pump fuel supply systems.

Figure 6:
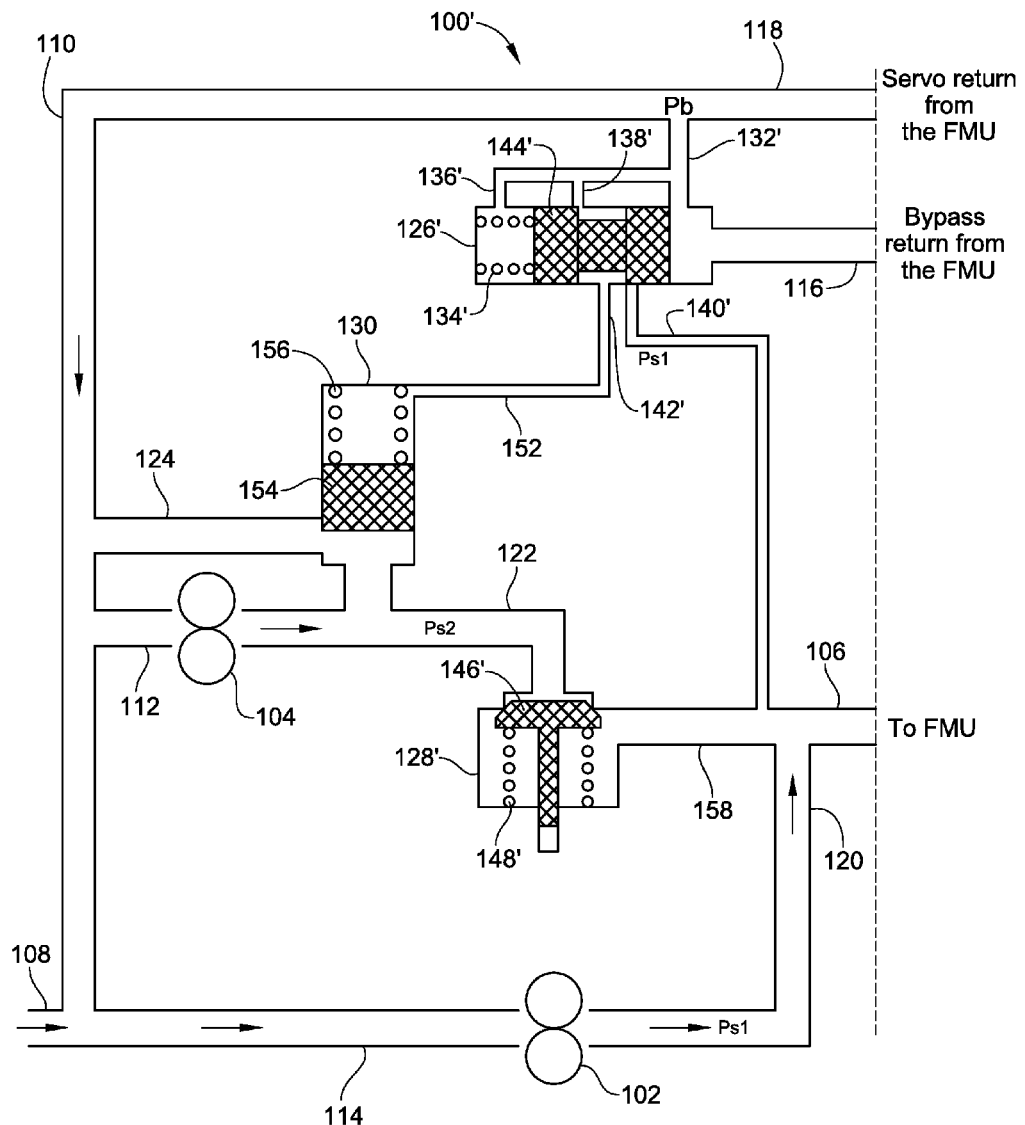
FIGS. 6-8 are schematic illustrations of an embodiment of the present invention utilizing a proportional plus integral bypass return sensing pump switch with an adder check valve in different operating modes.

Turning now to FIG. 6, there is illustrated an alternative embodiment of the flow sensing dual pump switching system 100'. As with the embodiment discussed above, the sensing valve's 126' sensing port 132' opening, and therefore the position of the valving member 144' is directly a function of the amount of bypass return flow 116 from the fuel metering unit. However, instead of the hydraulic bridge of the sensing valve 126' providing a signal to move the flow sharing valve used in the previous embodiment, the sensing valve's positioning port 142' connects to the pressure regulating valve's control port 152 as the valve's referenced pressure.

As an overview of this embodiment's operation, when sufficient bypass return flow is sensed at the sensing port 132', the valving member 144 is positioned such that the sensing valve's pressure reduction port 138' is connected to the positioning port 142' so that relatively low pressure is supplied as the pressure regulating valve's reference pressure. As such, the second pump 104's output pressure remains low relative to that of the first pump 102. In this situation the flow sharing valve 128' (embodied here as an adder valve) remains closed and prevents the flow from the second pump 104 from being supplied to the fuel metering unit.

When the bypass return flow 116 is reduced due to an increase in the fuel demand of the engine, the valving member 144' of the sensing valve 126' is positioned such that the pressure addition port 140' is connected to the positioning port 142' so that relatively high pressure is supplied to the pressure regulating valve 130. As the second pump's 104 discharge pressure is increased above the first pump's 102 discharge pressure, this higher pressure flow is supplied through adder port 158 to supplement the flow from the first pump 102 to supply flow to the fuel metering unit via the high pressure supply 106. As with the previous embodiment, this control of the output pressure of the second pump 104 and prevention of addition of the flow from this pump to that of the first pump 102 until the pressure thereof exceeds the pressure of the first pump 102, flow disturbances to the engine are substantially reduced.

Figure 7:
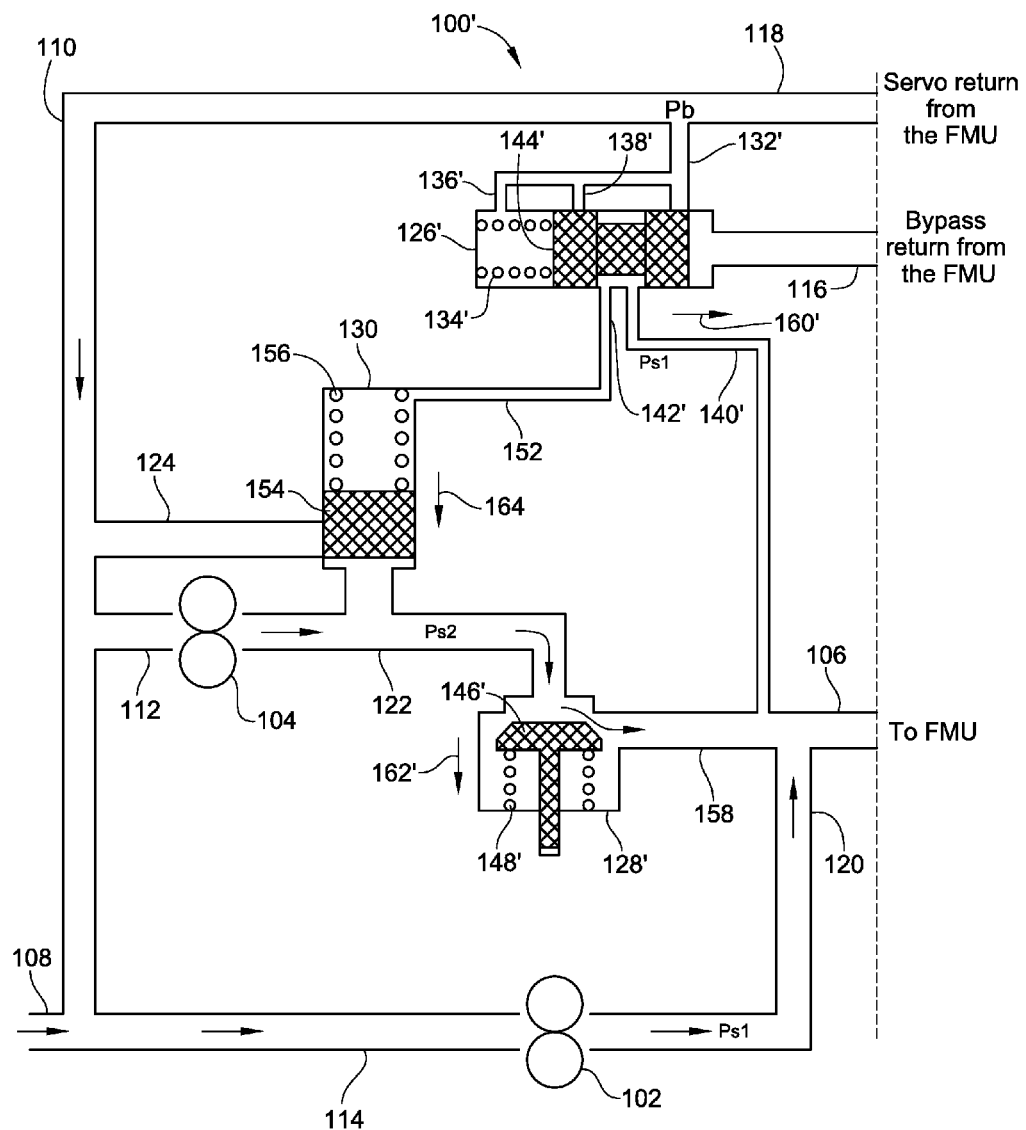
Figure 8:
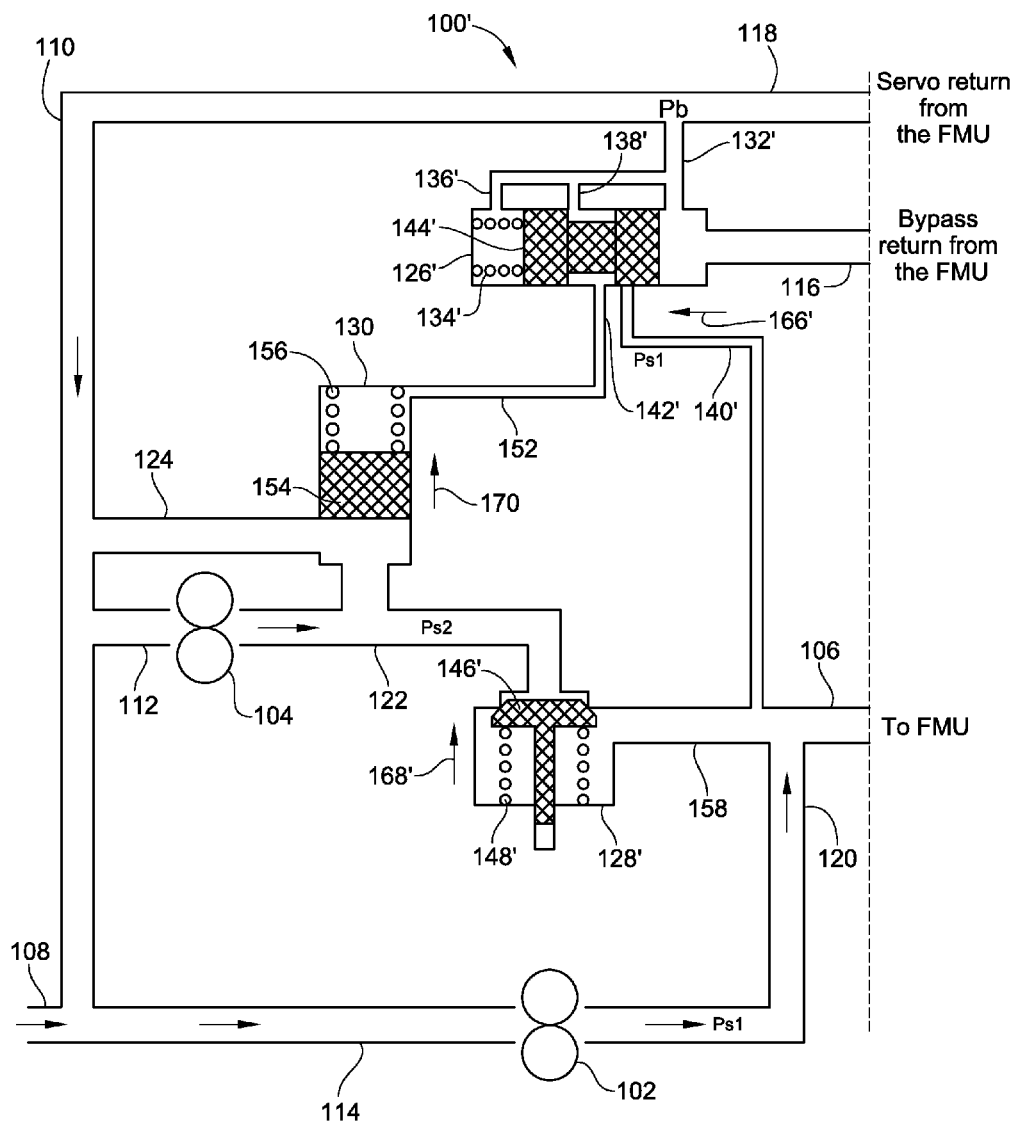

With this basic understanding of the operation of the embodiment illustrated in FIG. 6 now in hand, attention is directed to the schematic of FIG. 7, which illustrates the movement of the various valves of the switching system 100' as the fuel consumption of the engine increases beyond the capability of the single pump mode of operation. As the demand for fuel increases at the engine, the amount of fuel flowing through the bypass return 116 from the fuel metering unit will decrease, resulting in movement of the valving member 144' to the right as illustrated by arrow 160' of FIG. 7. This movement will connect the sensing valve's pressure addition port 140' to the sensing valve's positioning port 142' so as to provide high pressure to the pressure regulating valve 130 via its control port 152.

As the pressure to the pressure regulating valve 130 is increased, its valving member 154 will move downwardly as illustrated by arrow 164 in FIG. 7. This downward movement of valving member 154 will increase the pressure differential of the second pump 104 such that the pressure in the high pressure output 122 will increase. As the pressure increases beyond that of the first pump 102 in its high pressure output 120, the flow from the second pump 104 will overcome the spring force of bias spring 148' and result in addition of high pressure flow via the adder port 158 to the high pressure supply 106 to the fuel metering unit of the engine. This increased fuel flow will satisfy the increased fuel demand of the engine, and the controlled addition thereof via the flow sharing valve 128' will prohibit fuel flow disturbances that are common with prior dual pump switching systems.

As the fuel consumption demand of the engine decreases, the amount of fuel in the bypass return 116 from the fuel metering unit will increase. Such increased bypass flow will result in movement of the valving member 144' to the left as illustrated by arrow 166' of FIG. 8. This movement will eventually result in the positioning port 142' being coupled to the pressure reduction port 138'. This will result in a decrease in the pressure supplied to the pressure regulating valve 130 via the control port 152 such that its valving member 154 will move in an upward direction as illustrated by arrow 170 of FIG. 8. This upward movement of valving member 154 will result in increased bypass flow through the second pump bypass 124. As the bypass is increased, the pressure in the high pressure output 122 will drop below that of the combined high pressure output 120 from the first pump 102 and the bias spring 148 pressure such that the valving member 146' of the flow sharing valve 128' will move upwardly as illustrated by arrow 168' of FIG. 8. Assuming continued high bypass return 116 from the fuel metering unit, the valving member 146' will ultimately close so as to return the system to a single pump mode of operation. However, this switching from dual pump to single pump mode will similarly not result in a flow disturbance to the fuel metering unit as such switching occurs gradually as the pressure is reduced due to the increased bypassing of the output of the second pump 104.

Turning now to FIG. 9, there is illustrated a further embodiment of the flow sensing dual pump switching system 100" of the present invention. Unlike the configuration illustrated in the embodiment of FIG. 1, the flow sensing port 132" has been incorporated into the flow sharing valve 128" and the sensing valve has been eliminated. The flow sharing valve 128" is configured so that a nearly constant differential pressure is maintained across the flow sensing port 132". The sensing port 132" opening is again directly a function of the amount of bypass return 116 from the fuel metering unit. The flow sharing valve 128" is now directly positioned by the flow sensing port 132" opening. When sufficient bypass return flow 116 is sensed at the flow sensing port 132", the flow sharing valve 128" is positioned such that no flow from the second pump 104' is supplied to the fuel metering unit via the high pressure supply 106. When the bypass return flow 116 is sensed to be less than the desired value at the sensing port 132", the flow sharing valve 128" is positioned such that the high pressure output 122 from the second pump 104 is supplied via the adder port 158 to the high pressure supply 106 to supply additional fuel to the fuel metering unit to supplement the high pressure output 120 from the first pump 102. As with the previous embodiments, the bypass return 116 flow affects the pressurization of the second pump 104, and the flow sharing valve 128" is configured such that addition of the high pressure output 122 flow from the second pump 104 is held off until the output pressure in the high pressure output 122 at least equals that of the first pump 102 in the high pressure output 120. In this way, this embodiment also precludes the flow disturbances common in prior dual pump switching systems.

With this basic understanding now in hand, attention is directed to FIG. 10 which illustrates the switching from a single pump mode of operation to a dual pump mode of operation as the engine fuel consumption requirements increase over that illustrated in the positioning of the valves of FIG. 9. Specifically, an increase in the fuel consumption requirements of the engine will result in a reduction in the bypass return 116 from the fuel metering unit as more fuel is consumed and less is bypassed. Such reduction in the bypass return 116 flow will result in an upward movement of valving member 146" as illustrated by arrow 162" in FIG. 10. This upward movement of valving member 146" will result in the coupling of the pressure addition port 140" to the pressure regulating valve's control port 152". The increased pressure in the pressure regulating valve 130" will result in movement of the valving member 154" in the upward direction as illustrated by arrow 164" of FIG. 10. This upward movement will increase the output pressure of the second pump 102 by reducing the port area and provides a greater restriction to the flow that is able to be bypassed via bypass 124. Continued reduction in the bypass return 116 flow will allow the valving member 146" to continue in its upward movement represented by arrow 162" such that the high pressure output 122 from the second pump 104 will be added via the adder port 158 to the high pressure supply 106 to the fuel metering unit of the engine.

As the fuel consumption requirement of the engine is reduced, an increasing amount of bypass return 116 flow from the fuel metering unit will occur. With this increased bypass flow at the sensing port 132", the valving member 146" will move in a downward direction as illustrated by arrow 168" of FIG. 11. This continued downward movement will result in a reduction in the pressure supplied via control port 152" and will allow a reduction in pressure of the pressure regulating valve 130" via the pressure reduction port 138" shown in FIG. 11 with an appropriately sized restriction to control the dynamic reduction in output pressure of the second pump 104. As the amount of flow from the second pump 104 is decreased, continuing high bypass flow at sensing port 132" will continue the downward movement of valving member 146" until the output of the second pump 104 is disconnected from the adder port 158 and the fuel supply system returns to the single pump mode of operation (see FIG. 9). As with the previous embodiments, the configuration of the flow sensing dual pump switching system 100" reduces or eliminates any flow disturbances that typically result from switching between single and dual pump modes of operation. This is due to the dynamic control of the output pressure of the second pump and its addition or subtraction from the total flow through the high pressure supply 106 to the fuel metering unit.

Figure 12:
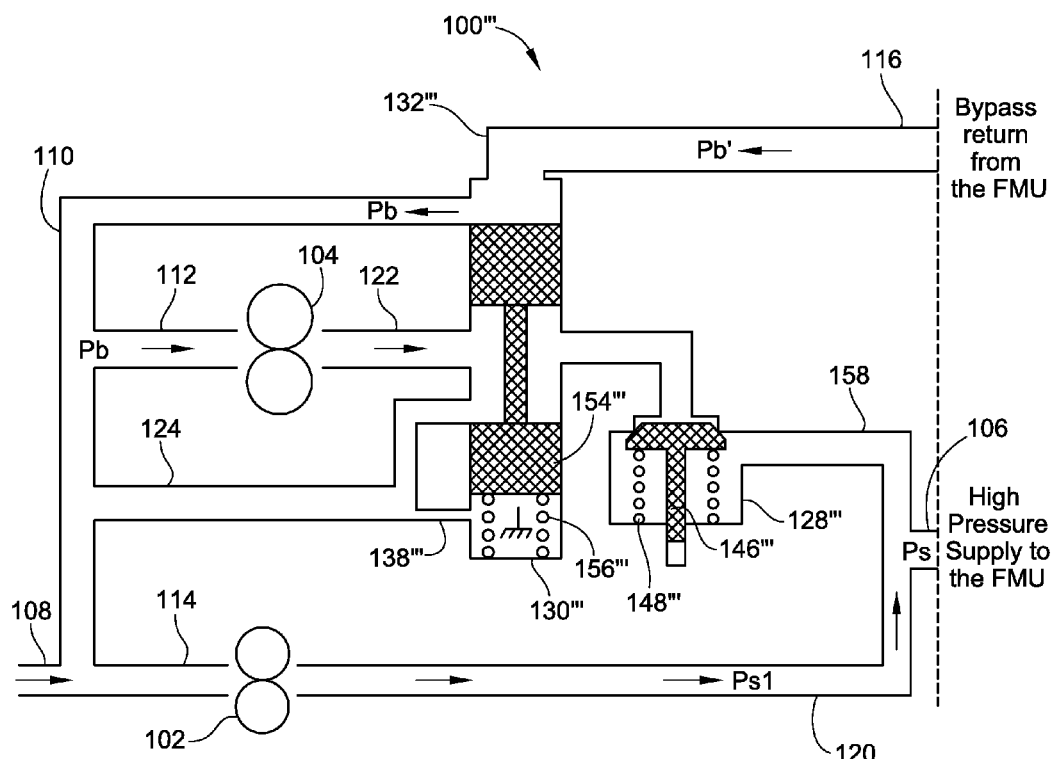
FIGS. 12-15 are schematic illustrations of an embodiment of the present invention utilizing a combined proportional bypass return sensing and pump two pressurizing valve pump switch system in different operating modes.

FIG. 12 illustrates an additional embodiment of the flow sensing dual pump switching system 100''', which is somewhat similar to the embodiment illustrated in FIG. 6. However, in the embodiment of FIG. 12, the sensing port 132''' has been incorporated into the pressure regulating valve 130'''. The sensing valve has been eliminated and the adder valve (flow sharing valve 128''') prevents backflow. The pressure regulating valve 130''' is configured so that a nearly constant differential pressure is maintained across the sensing port 132'''. The opening of the sensing port 132''' is again directly a function of the amount of bypass return flow from the fuel metering unit through the bypass return 116. In addition, total high pressure output 122 from the second pump 104 is supplied to valve 130''' and excess flow is returned via bypass 124 to the inlet 112 through an added bypass return port on the pressure regulating valve 130'''.

As an overview, when sufficient bypass return 116 is sensed at the sensing port 132''', the resulting position of valving member 154''' is such that the pressure drop through the bypass return port coupled to the second pump bypass 124 is low and, as a result, the discharge pressure of the second pump 104 is low relative to that of the first pump 102 discharge pressure. The flow sharing valve 128''' prevents the flow from the first pump 102 in the high pressure output 120 from backflowing through the adder port 158 to the second pump 104.

When bypass return flow 116 is sensed to be less than the desired value, the resulting position of valving member 154''' is such that the bypass port restricts the bypass 124 flow, thus increasing the second pump 104 discharge pressure. As the second pump 104 discharge pressure in the high pressure output 122 is increased above that of the first pump's 102 discharge pressure in the high pressure output 120, the flow from the second pump 104 is supplied through the flow sharing valve 128''' to supplement the first pump's 102 flow to the high pressure supply 106 to the fuel metering unit. This addition of the flow from the second pump 104 is accomplished without the flow disturbances typical in prior switching systems.

Figure 13:
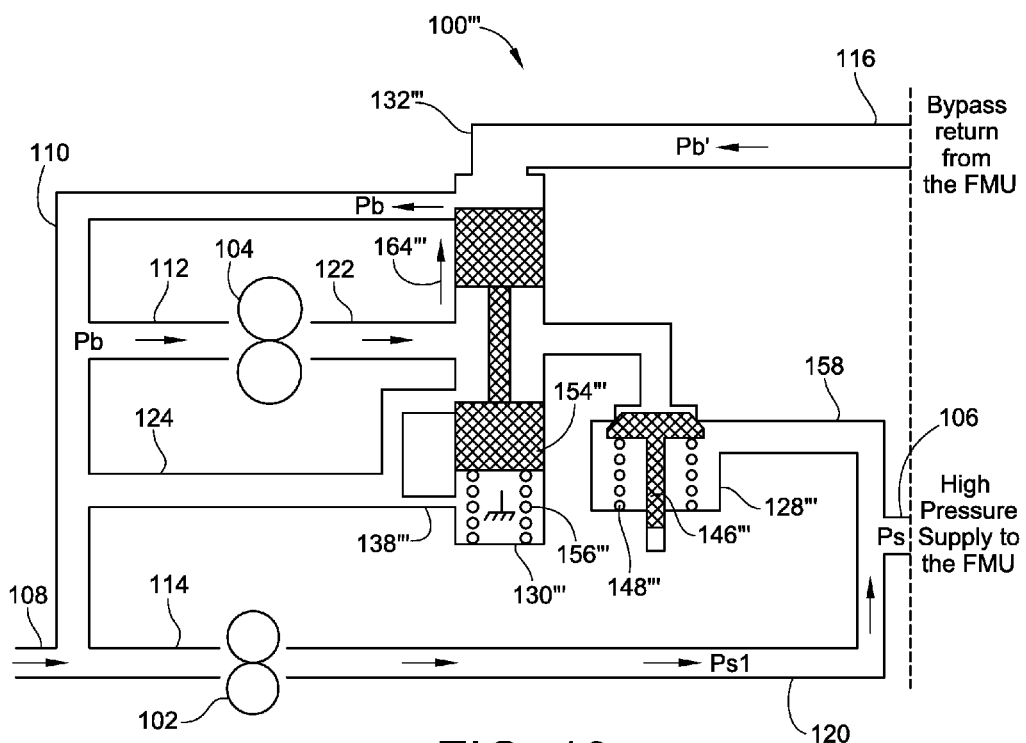
Figure 14:
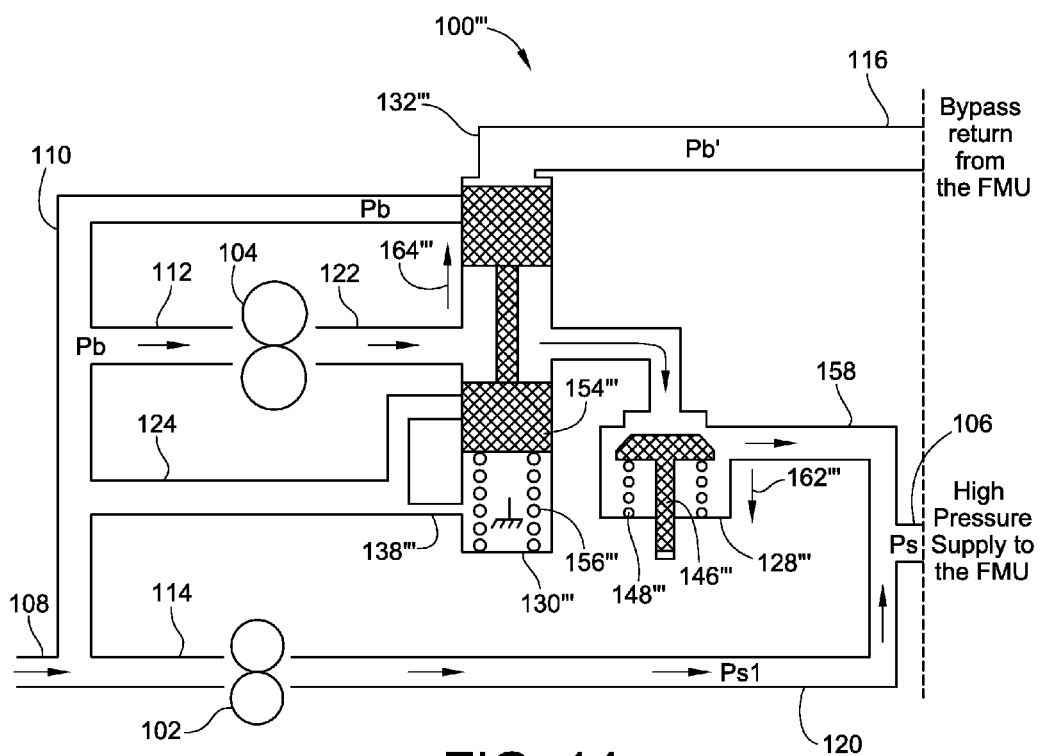
Figure 15:
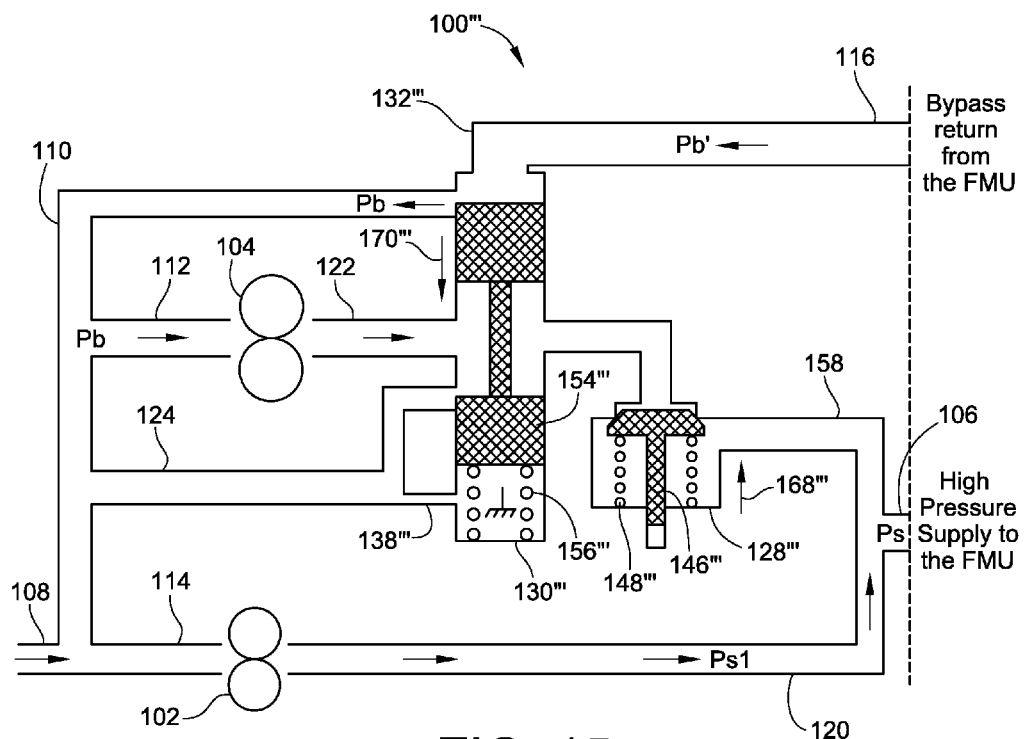

With this basic understanding of this embodiment now in hand, attention is directed to FIG. 13 which illustrates the dynamic response of the flow sensing dual pump switching system 100''' as the fuel demand requirement for the engine increases. As may be seen, during an increased fuel demand from the engine less fuel will be bypassed by the fuel metering unit to the bypass return 116. This reduced flow at sensing port 132''' results in the upward movement of valving member 154''' illustrated by arrow 164''' shown in FIG. 13. As may be seen, this movement along arrow 164''' will also result in a greater restriction to the flow through the pressure regulating valve 130''' into the second pump bypass 124. As discussed briefly above, this will result in an increased discharged pressure in the high pressure output 122, which is coupled through the pressure regulating valve 130''' to the flow sharing valve 128'''.

As the fuel demand from the engine increases beyond that capable of being supplied by the first pump 102 singly, continued reduction in the bypass return 116 will result in continued upward movement of valving member 154''' as illustrated by arrow 164'''. As the restriction to flow through the pressure regulating valve 130''' to the second pump bypass 124 is continued to be increased, the output pressure of the second pump 104 increases to the point where it overcomes the pressure in high pressure output 120 from the first pump 102 and the bias force from bias spring 148''' such that the valving member 146''' is moved downward as illustrated by arrow 162''' of FIG. 14. This movement of valving member 146''' will result in the flow from the second pump 104 to be added via the adder port 158 to the flow from the first pump 102 in the high pressure output 120 to the fuel metering unit via the high pressure supply 106.

As the fuel demand from the engine is reduced, more fuel will be bypassed by the fuel metering unit to the bypass return 116. As this increased flow is sensed at sensing port 132''', valving member 154''' will move downwardly as illustrated by arrow 170''' shown in FIG. 15. As the valving 154''' moves in a downward direction as shown by arrow 170''', an increasing amount of the output flow from the second pump 104 is allowed to flow through bypass 124, thus reducing the output differential pressure of the second pump 104. As this output pressure differential decreases, the valving member 146''' of the flow sharing valve 128''' will move in an upward direction as shown by arrow 168'''. With continued bypass flow, continued movement of valving member 154''' will result in valving member 146''' closing off the flow from the second pump 104 through the adder port 158 such that the high pressure supply 106 to the fuel metering unit will be supplied solely from the high pressure output 120 from the first pump 102. Because of the dynamic adjustment of the output pressure differential of the second pump 104, the switching from single pump to dual pump modes of operation and vice versa are accomplished without the flow disturbances typical with prior dual pump switching system.

Figure 16:
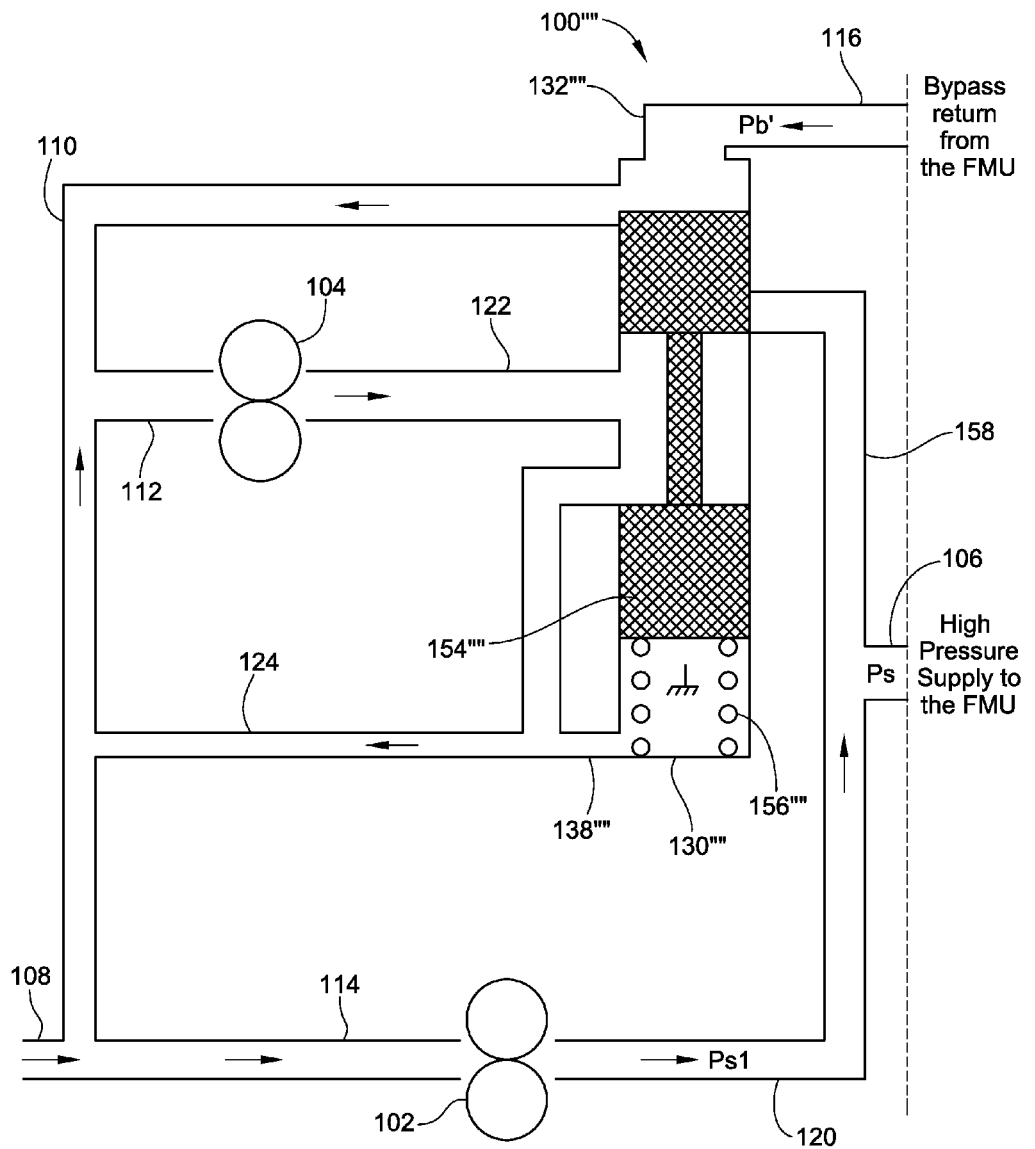
FIGS. 16-19 are schematic illustrations of an embodiment of the present invention utilizing a combined proportional bypass return sensing, pump two pressurizing, and flow sharing valve pump switch system in different operating modes.

Turning now to FIG. 16, there is illustrated a further embodiment of the flow sensing dual pump switching system 100''''. This embodiment is similar to that discussed with regard to FIG. 12, except the adder port 158 has been positioned with the pressure regulating valve 130'''' such that the flow sharing valve may be eliminated. In this embodiment and as an overview, the sensing port 132'''' opening is again directly a function of the amount of fuel that the fuel metering unit bypasses through the bypass return 116. The valving member 154'''' is directly positioned based on the opening of the flow sensing port 132''''.

That is, when sufficient bypass return flow through the bypass return 116 is sensed at the sensing port 132'''', the resulting positioning of valving member 154'''' is such that the pressure drop through the bypass return port coupled to the second pump bypass 124 is low, and as a result the second pump 104 discharge pressure is low relative to the first pump 102 discharge pressure in the high pressure output 120. This also results in the closure of the adder port 158, and therefore prevents the second pump 104 flow from being supplied via the high pressure supply 106.

When the bypass return flow is sensed to be less than that desired, the resulting position of the valving member 154'''' is such that the bypass port coupling the high pressure output 122 to the second pump bypass 124 is restricted, thus increasing the second pump 104 discharge pressure. The configuration of the valving member 154'''' and the positioning of the adder port 158 will result in the addition of the high pressure output 122 from the second pump 104 via the adder port 158 to the high pressure supply 106 as the pressure from the second pump 104 at least equals that of the first pump 102 in the high pressure output 120. This is done so as to prohibit any flow disturbance, common in prior switching systems, as the second pump 104 is brought on line.

Figure 17:
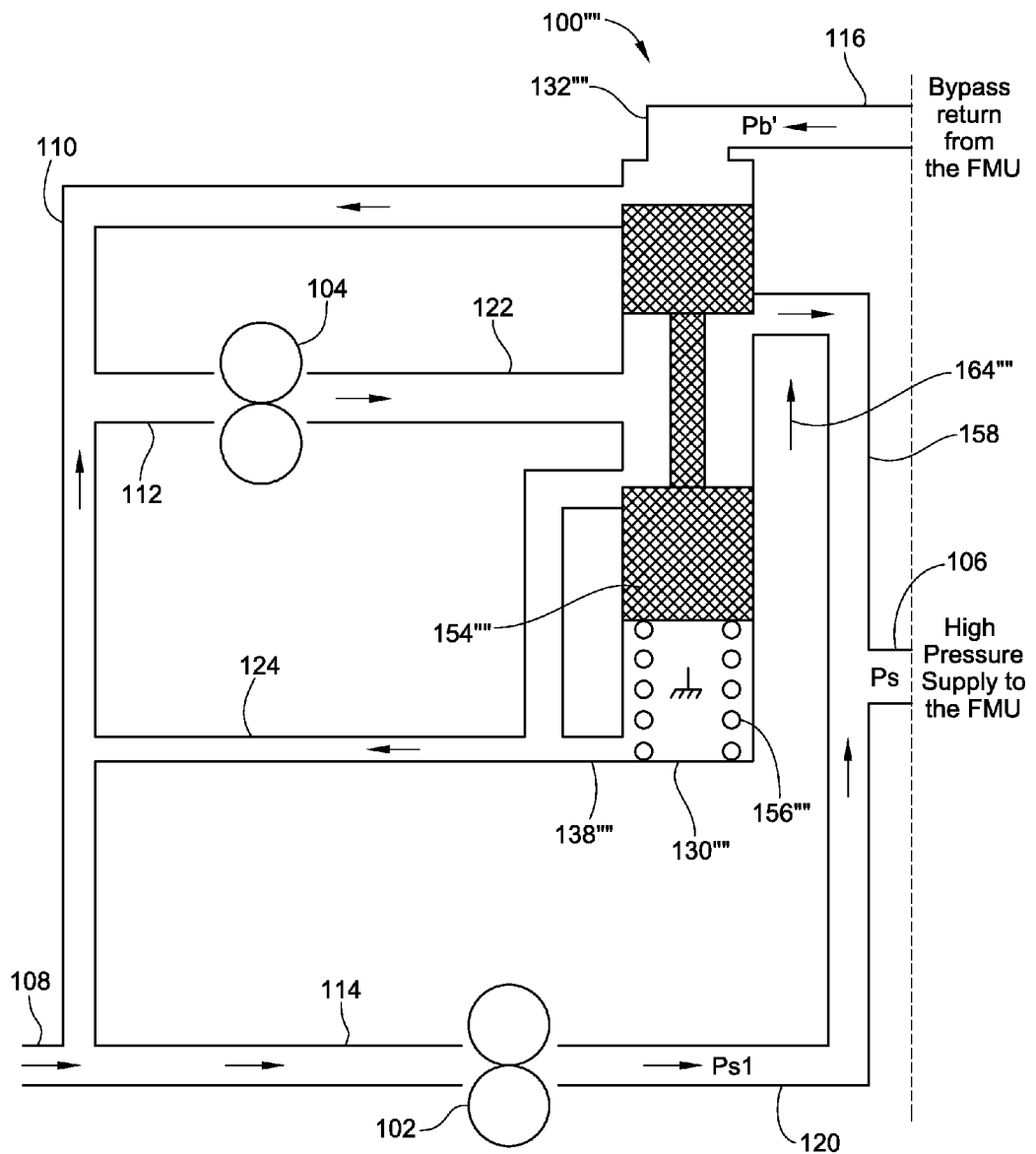

With this basic understanding of the operation of the embodiment of FIG. 16 now in hand, attention is directed to FIG. 17 which illustrates dynamic movement of valving member 154'''' as the fuel demand from the engine increases, thereby reducing the flow through bypass return 116 as sensed by the sensing port 132''''. As shown, a reduction in the flow in bypass return 116 will result in an upward movement of valving member 154'''' as indicated by arrow 164'''' shown in FIG. 17. This movement will result in a closure of the flow through second pump bypass 124, thus increasing the output pressure of the high pressure output 122. This movement will also begin to open the adder port 158 to allow a portion of the output of the second pump 104 to be added to the high pressure output 120 from the first pump 102 to the high pressure supply 106. The control of the pressurization of the second pump 104 is such that its output pressure is at least equal to that of the pressure of the first pump 102 so as to preclude any flow disturbance to the engine.

Figure 18:
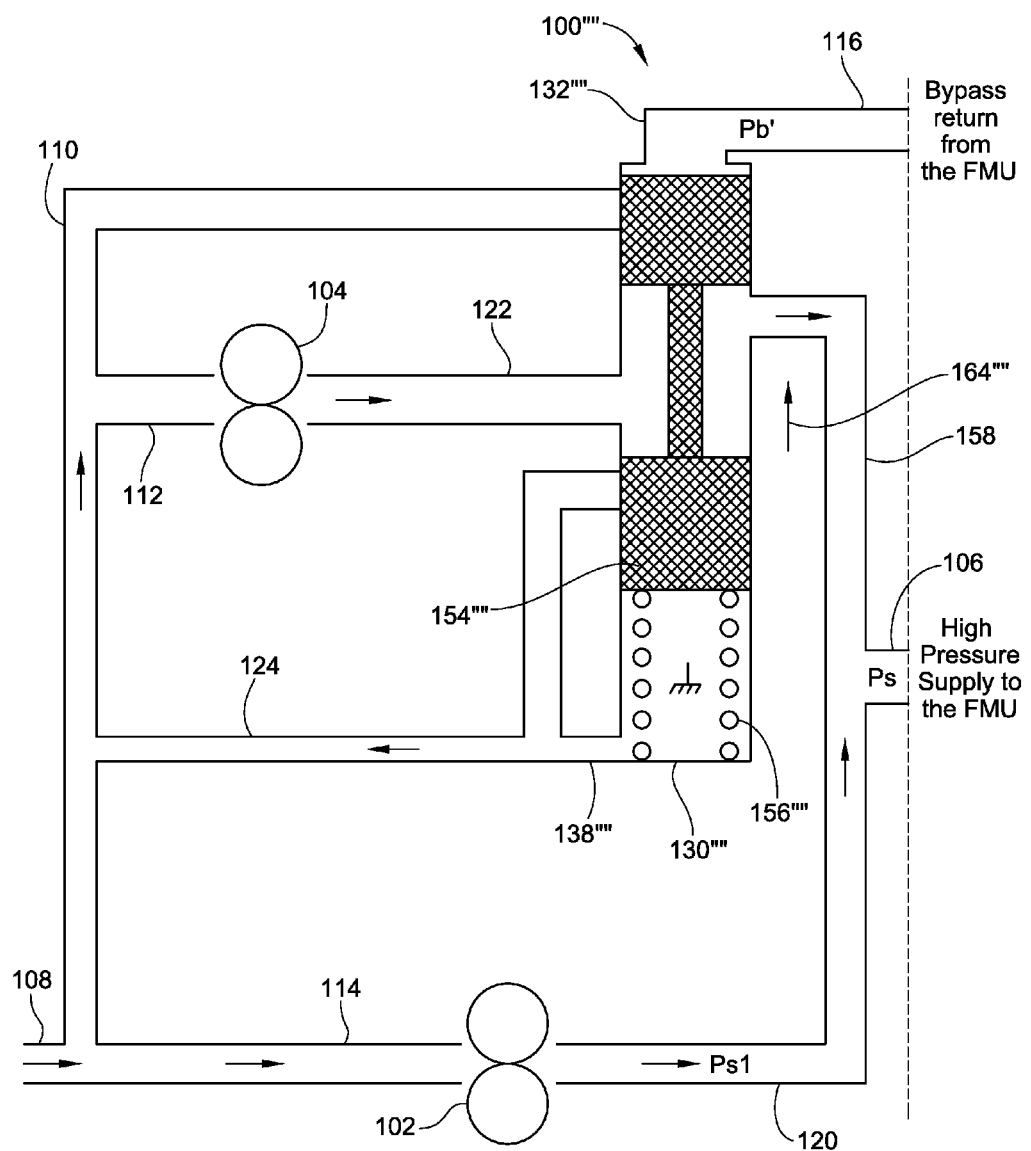

As the engine continues to increase its fuel demand, further movement of valving member 154'''' in the direction of arrow of 164'''' as shown in FIG. 18 will result in the full opening of the adder port such that all of the output of second pump 104 is supplied from the high pressure output 122 through the adder port 158 to the high pressure supply 106 in addition to the high pressure output 120 from the first pump 102.

Figure 19:
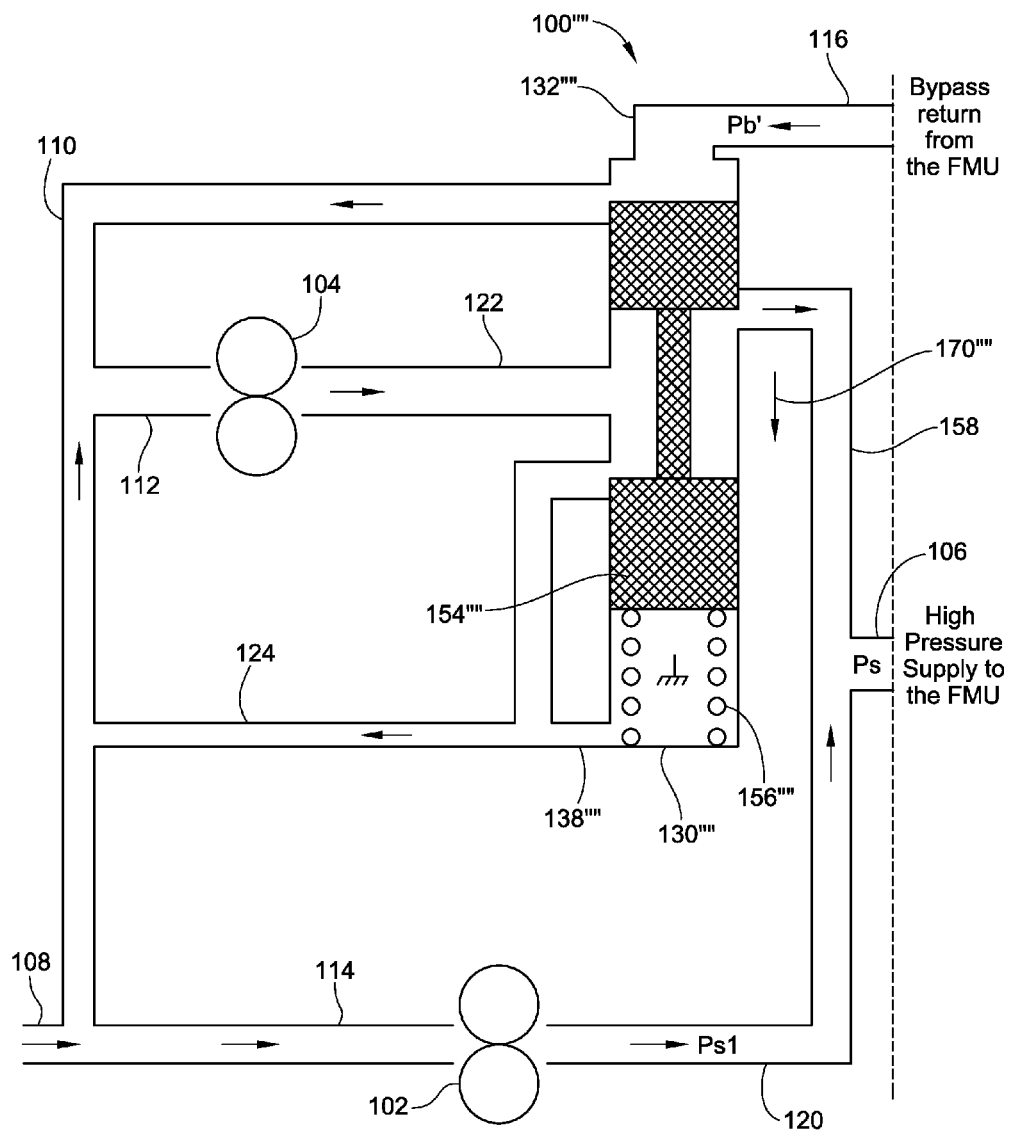

FIG. 19 illustrates the dynamic movement of valving member 154'''' as the engine fuel consumption requirement is reduced from the maximum flow shown in FIG. 18. That is, as the engine fuel consumption requirement is reduced, the fuel metering unit will begin to bypass a greater portion of the fuel flow from the high pressure supply 106 to the bypass return 116. This increased bypass fuel flow will be sensed at the sensing port 132'''', which will result in downward movement of valving member 154'''' as illustrated by arrow 170'''' shown in this FIG. 19. Such downward movement will result in a partial closure of the adder port 154 and a partial opening of the bypass port leading to the second pump bypass 124. A continued reduction of the fuel consumption requirement from the engine will result in further downward movement of the valving member 154'''' until the system is switched back to the single pump mode of operation as shown in FIG. 16.

It will now be apparent to those skilled in the art from the foregoing description that a method of switching a dual pump fuel supply system based on bypass flow sensing includes the steps of sensing this bypass flow from the fuel metering unit. Based on this bypass flow pressure, the differential pressure of the second pump may be increased in preparation for addition of the flow from this second pump to that of the flow from the first pump to supply the increased demand. Also based on the bypass flow pressure, the differential pressure of the second pump may be reduced and, if operating in a dual pump mode, possibly taken off line to return the system to a single pump mode of operation as the fuel consumption requirements of the engine are reduced. In order to preclude flow disturbances common with prior switching systems, the method ensures that the addition of the flow from the second pump does not take place until the output pressure of the second pump is at least equal to that of the first pump so as to prevent any backflow that would detract from the flow supply to the engine. An embodiment of the method also includes dynamically adjusting the amount of the flow from the second pump to be added to that of the first pump so as to maintain the bypass flow at an acceptable level to ensure adequate fuel supply to the engine to take into account the dynamic transients of the fuel consumption requirement without unnecessarily adding to a thermal issue that may result from unnecessarily high bypass flow situation.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A switching system for use with a dual pump fuel supply system for an aircraft engine, the dual pump fuel supply system including a first pump having a first high pressure output coupled to a high pressure supply to a fuel metering unit, wherein the fuel metering unit is configured to supply a portion of the fuel supply to an engine and to return a bypass flow of the fuel supply to a low pressure return that is coupled to a first low pressure supply to the first pump, and a second pump having a second high pressure output and a second low pressure supply that is coupled to the low pressure return, the second pump also having a second pump bypass that is coupled to the second low pressure supply, comprising:
    means for sensing the bypass flow coming directly from the fuel metering unit;
    means, operatively coupled to the means for sensing the bypass flow coming directly from the fuel metering unit, for controlling a pressurization of the second pump; and
    means for adding or subtracting the second high pressure output from the second pump to the first high pressure output from the first pump, wherein said means for adding are downstream from the first and second high pressure outputs and upstream from the fuel metering unit.

2. The switching system of claim 1, wherein the means for sensing the bypass flow from the fuel metering unit includes a sensing valve having a sensing port coupled to a bypass return from the fuel metering unit, a return port coupled to the low pressure return, and a sensing valve valving member positioned therebetween, the sensing valve further including a position port, a pressure reduction port, and a pressure addition port, wherein a differential pressure between the sensing port and the return port controls a position of the sensing valve valving member, and wherein the position of the sensing valve valving member selectively couples one of the pressure reduction port or the pressure addition port to the position port.

3. The switching system of claim 2, wherein the means for adding or subtracting the second high pressure output from the second pump to the first high pressure output from the first pump includes a flow sharing valve having a first port coupled to the second high pressure output of the second pump, an adder port coupled to high pressure supply to the fuel metering unit, a third port coupled to the position port of the sensing valve, a flow sharing valve return port coupled to the low pressure return, and a flow sharing valve valving member, and wherein a differential pressure between the flow sharing valve return port and the third port controls a position of the flow sharing valve valving member, and wherein the position of the flow sharing valve valving member controllably varies a fluid communication between the second high pressure output and the adder port.

4. The switching system of claim 3, wherein the means for controlling the pressurization of the second pump includes a pressure regulating valve having a first port coupled to the second pump bypass, a second port coupled to the second high pressure output, and a pressure regulating valve valving member movably positioned to controllably vary a fluid communication between the second high pressure output and the second pump bypass, the flow sharing valve further including a fourth port coupled to the high pressure supply and a fifth port, and wherein the position of the flow sharing valve valving member controllably varies a fluid communication between the fourth port and the fifth port, the pressure regulating valve having a control port coupled to the fifth port of the flow sharing valve, and wherein the position of the pressure regulating valve valving member is controlled by a pressure communicated by the control port.

5. The switching system of claim 4, wherein a reduction in pressure at the sensing port causes movement of the sensing valve valving member such that the position port is coupled to the pressure reduction port, which causes movement of the flow sharing valve valving member such that the fourth port is coupled to the fifth port, which causes movement of the pressure regulating valve valving member whereby fluid communication between the second high pressure output and the second pump bypass decreases whereby a pressure in the second high pressure output increases.

6. The switching system of claim 5, wherein a continuing reduction in pressure at the sensing port results in further movement of the flow sharing valve valving member such that the second high pressure output is coupled to the adder port thereby adding flow from the second pump to the high pressure supply to the fuel metering unit.

7. The switching system of claim 4, wherein an increase in pressure at the sensing port causes movement of the sensing valve valving member such that the position port is coupled to the pressure addition port, which causes movement of the flow sharing valve valving member such that the adder port is at least partially closed from the second high pressure output thereby subtracting flow from the second pump to the high pressure supply to the fuel metering unit.

8. The switching system of claim 7, wherein a continuing increase in pressure at the sensing port results in further movement of the flow sharing valve valving member such the fourth port is at least partially closed from the fifth port, which causes movement of the pressure regulating valve valving member whereby fluid communication between the second high pressure output and the second pump bypass is increased whereby a pressure in the second high pressure output decreases.

9. The switching system of claim 2, wherein the means for adding or subtracting the second high pressure output from the second pump to the first high pressure output from the first pump includes an adder valve having a first port coupled to the second high pressure output of the second pump, an adder port coupled to the high pressure supply to the fuel metering unit, and a adder valving member positioned between the first port and the adder port that is spring biased to a closed position, and wherein a differential pressure between the first port and the adder port controls a position of the adder valve valving member, and wherein the position of the adder valve valving member controllably varies a fluid communication between the second high pressure output and the adder port.

10. The switching system of claim 9, wherein the means for controlling the pressurization of the second pump includes a pressure regulating valve having a first port coupled to the second pump bypass, a second port coupled to the second high pressure output, and a pressure regulating valve valving member movably positioned to controllably vary a fluid communication between the second high pressure output and the second pump bypass, the flow sharing valve further including a control port coupled to the positioning port of the sensing valve, and wherein the position of the pressure regulating valve valving member is controlled by a pressure communicated by the control port.

11. The switching system of claim 10, wherein a reduction in pressure at the sensing port causes movement of the sensing valve valving member such that the positioning port is coupled to the pressure addition port, which causes movement of the pressure regulating valve valving member whereby fluid communication between the second high pressure output and the second pump bypass decreases whereby a pressure in the second high pressure output increases.

12. The switching system of claim 11, wherein a continuing reduction in pressure at the sensing port results in further increase in pressure in the second high pressure output creating a pressure differential across the adder valve valving member causing movement thereof such that the second high pressure output is coupled to the adder port thereby adding flow from the second pump to the high pressure supply to the fuel metering unit.

13. The switching system of claim 4, wherein an increase in pressure at the sensing port causes movement of the sensing valve valving member such that the positioning port is coupled to the pressure reduction port, which causes movement of the pressure regulating valve valving member whereby fluid communication between the second high pressure output and the second pump bypass is increased whereby a pressure in the second high pressure output decreases thereby reducing the pressure differential across the adder valve valving member and reducing flow from the second pump to the high pressure supply to the fuel metering unit.

14. The switching system of claim 13, wherein a continuing increase in pressure at the sensing port results in further movement of the pressure regulating valve valving member whereby fluid communication between the second high pressure output and the second pump bypass is increased whereby a pressure in the second high pressure output decreases thereby further decreasing the pressure differential across the adder valve valving member resulting is closure thereof and elimination of flow from the second pump to the high pressure supply to the fuel metering unit.

15. The switching system of claim 1, wherein the means for sensing the bypass flow from the fuel metering unit and the means for adding or subtracting the second high pressure output from the second pump to the first high pressure output from the first pump include a flow sharing valve having a sensing port coupled to a bypass return from the fuel metering unit, a return port coupled to the low pressure return, and a flow sharing valve valving member positioned therebetween, the flow sharing valve further including a position port and a pressure addition port, wherein a differential pressure between the sensing port and the return port controls a position of the sensing valve valving member, and wherein the position of the sensing valve valving member selectively couples the pressure addition port to the position port, the flow sharing valve further having a first port coupled to the second high pressure output of the second pump and an adder port coupled to high pressure supply to the fuel metering unit, and wherein the position of the flow sharing valve valving member controllably varies a fluid communication between the second high pressure output and the adder port.

16. The switching system of claim 15, wherein the means for controlling the pressurization of the second pump includes a pressure regulating valve having a first port coupled to the second pump bypass, a second port coupled to the second high pressure output, a control port coupled to the position port of the flow sharing valve, a pressure reduction port coupled to the second pump bypass, and a pressure regulating valve valving member movably positioned to controllably vary a fluid communication between the second high pressure output and the second pump bypass, and wherein the position of the pressure regulating valve valving member is controlled by at least one of a pressure communicated by the control port and by the pressure reduction port.

17. The switching system of claim 16, wherein a reduction in pressure at the sensing port causes movement of the flow sharing valve valving member such that the positioning port is coupled to the pressure addition port, which causes movement of the pressure regulating valve valving member whereby fluid communication between the second high pressure output and the second pump bypass decreases whereby a pressure in the second high pressure output increases.

18. The switching system of claim 17, wherein a continuing reduction in pressure at the sensing port results in further movement of the flow sharing valve valving member such that the second high pressure output is coupled to the adder port thereby adding flow from the second pump to the high pressure supply to the fuel metering unit.

19. The switching system of claim 18, wherein an increase in pressure at the sensing port causes movement of the flow sharing valve valving member such that the adder port is at least partially closed from the second high pressure output thereby subtracting flow from the second pump to the high pressure supply to the fuel metering unit.

20. The switching system of claim 19, wherein a continuing increase in pressure at the sensing port causes further movement of the flow sharing valve valving member such that the position port is decoupled from the pressure addition port such that a reduction in pressure on the pressure regulating valve via the pressure reduction port results in movement of the pressure regulating valve valving member whereby fluid communication between the second high pressure output and the second pump bypass is increased whereby a pressure in the second high pressure output decreases.

21. The switching system of claim 1, wherein the means for sensing the bypass flow from the fuel metering unit and the means for controlling the pressurization of the second pump to the first high pressure output from the first pump include a pressure regulating valve having a sensing port coupled to a bypass return from the fuel metering unit, a pressure reduction port coupled to the second pump bypass, and a pressure regulating valve valving member positioned therebetween, the pressure regulating valve further including a first port coupled to the second pump bypass, a second port coupled to the second high pressure output, a third port in fluid communication with the second port, and wherein the pressure regulating valve valving member is movably positioned to controllably vary a fluid communication between the second high pressure output and the second pump bypass, and wherein the position of the pressure regulating valve valving member is controlled by a pressure differential between the sensing port and the pressure reduction port.

22. The switching system of claim 21, wherein the means for adding or subtracting the second high pressure output from the second pump to the first high pressure output from the first pump includes an adder valve having a first port coupled to the third port of the pressure regulating valve, an adder port coupled to the high pressure supply to the fuel metering unit, and a adder valve valving member positioned between the first port and the adder port that is spring biased to a closed position, and wherein a differential pressure between the first port and the adder port controls a position of the adder valve valving member, and wherein the position of the adder valve valving member controllably varies a fluid communication between the second high pressure output and the adder port.

23. The switching system of claim 22, wherein a reduction in pressure at the sensing port causes movement of the pressure regulating valve valving member whereby fluid communication between the second high pressure output and the second pump bypass decreases whereby a pressure in the second high pressure output increases.

24. The switching system of claim 23, wherein a continuing reduction in pressure at the sensing port results in further increase in pressure in the second high pressure output creating a pressure differential across the adder valve valving member causing movement thereof such that the second high pressure output is coupled to the adder port thereby adding flow from the second pump to the high pressure supply to the fuel metering unit.

25. The switching system of claim 24, wherein an increase in pressure at the sensing port causes movement of the pressure regulating valve valving member whereby fluid communication between the second high pressure output and the second pump bypass is increased whereby a pressure in the second high pressure output decreases thereby reducing the pressure differential across the adder valve valving member and reducing flow from the second pump to the high pressure supply to the fuel metering unit.

26. The switching system of claim 25, wherein a continuing increase in pressure at the sensing port results in further movement of the pressure regulating valve valving member whereby fluid communication between the second high pressure output and the second pump bypass is increased whereby a pressure in the second high pressure output decreases thereby further decreasing the pressure differential across the adder valve valving member resulting is closure thereof and elimination of flow from the second pump to the high pressure supply to the fuel metering unit.

27. The switching system of claim 1, wherein the means for sensing the bypass flow from the fuel metering unit, the means for controlling the pressurization of the second pump to the first high pressure output from the first pump, and the means for adding or subtracting the second high pressure output from the second pump to the first high pressure output from the first pump include a flow sharing valve having a sensing port coupled to a bypass return from the fuel metering unit, a pressure reduction port coupled to the second pump bypass, and a flow sharing valve valving member positioned therebetween, the flow sharing valve further including a first port coupled to the second pump bypass, a second port coupled to the second high pressure output, a third port coupled to the high pressure supply to the fuel metering unit, and wherein the flow sharing valve valving member is movably positioned to controllably vary a fluid communication between the second high pressure output, the second pump bypass, and the high pressure supply, and wherein the position of the flow sharing valve valving member is controlled by a pressure differential between the sensing port and the pressure reduction port.

28. The switching system of claim 27, wherein a reduction in pressure at the sensing port causes movement of the flow sharing valve valving member whereby fluid communication between the second high pressure output and the second pump bypass decreases whereby a pressure in the second high pressure output increases, and whereby fluid communication between the second high pressure output and the high pressure supply increases thereby adding flow from the second pump to the high pressure supply to the fuel metering unit.

29. The switching system of claim 28, wherein an increase in pressure at the sensing port causes movement of the flow sharing valve valving member whereby fluid communication between the second high pressure output and the second pump bypass is increased whereby a pressure in the second high pressure output decreases, and whereby fluid communication between the second high pressure output and the high pressure supply decreases thereby reducing flow from the second pump to the high pressure supply to the fuel metering unit.

30. A method of switching a dual pump fuel supply system for an aircraft engine, the dual pump fuel supply system including a first pump having a first high pressure output coupled to a high pressure supply to a fuel metering unit, wherein the fuel metering unit is configured to supply a portion of the fuel supply to an engine and to return a bypass flow of the fuel supply to a low pressure return that is coupled to a first low pressure supply to the first pump, and a second pump having a second high pressure output and a second low pressure supply that is coupled to the low pressure return, the second pump also having a second pump bypass that is coupled to the second low pressure supply, comprising the steps of:

sensing the bypass flow coming directly from the fuel metering unit;

controlling a pressurization of the second pump based on the step of sensing; and adding or subtracting the second high pressure output from the second pump to the first high pressure output from the first pump and providing an output flow to the downstream fuel metering unit based on the step of controlling.

\* \* \* \* \*